US009229696B2

(12) United States Patent
Box et al.

(10) Patent No.: US 9,229,696 B2
(45) Date of Patent: Jan. 5, 2016

(54) COMMON INTERMEDIATE REPRESENTATION FOR DATA SCRIPTING LANGUAGE

(71) Applicant: Microsoft Corporation, Redmond, WA (US)

(72) Inventors: Donald F. Box, Yarrowpoint, WA (US); Bradford H. Lovering, Seattle, WA (US); John D. Doty, Seattle, WA (US); Jeffrey C. Schlimmer, Redmond, WA (US); John L. Hamby, Seattle, WA (US); David E. Langworthy, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/902,636

(22) Filed: May 24, 2013

(65) Prior Publication Data
US 2013/0263099 A1    Oct. 3, 2013

Related U.S. Application Data

(63) Continuation of application No. 12/244,998, filed on Oct. 3, 2008, now Pat. No. 8,473,897.

(51) Int. Cl.
*G06F 9/44* (2006.01)
*G06F 9/45* (2006.01)

(52) U.S. Cl.
CPC ...... *G06F 8/437* (2013.01); *G06F 8/42* (2013.01); *G06F 8/31* (2013.01)

(58) Field of Classification Search
CPC ............. G06F 17/30; G06F 8/30; G06F 9/44; G06F 17/2247; G06F 8/315; G06F 8/40; G06F 8/437; G06F 8/42; G06F 8/31
See application file for complete search history.

(56) References Cited

U.S. PATENT DOCUMENTS

| 5,493,675 | A | 2/1996 | Faiman |
| 5,515,535 | A | 5/1996 | Frankel |
| 5,832,273 | A | 11/1998 | Mizuse |
| 6,067,413 | A | 5/2000 | Gustafsson |
| 6,145,120 | A | 11/2000 | Highland |
| 6,560,774 | B1 | 5/2003 | Gordon |
| 6,772,409 | B1 * | 8/2004 | Chawla ................ A47B 23/002 707/E17.006 |

(Continued)

OTHER PUBLICATIONS

Erik Meijer, Technical Overview of the Common Language Runtime, 2001, pp. 1-13.*

(Continued)

*Primary Examiner* — Thuy Dao
*Assistant Examiner* — Mongbao Nguyen
(74) *Attorney, Agent, or Firm* — Brian Haslam; Kate Drakos; Micky Minhas

(57) ABSTRACT

A common intermediate representation for a data scripting language is provided for efficient representation and direct specification of programming constructs in memory. The common intermediate representation of data scripts allows data intensive applications to be created and analyzed in a machine accessible format, and the elements of the common intermediate representation can be stored independent of underlying storage specifics. Stored elements of the common intermediate representation of code are thus available for fast loading in memory when desired by other applications and programs by mapping the stored elements to the in memory intermediate representation.

15 Claims, 17 Drawing Sheets

(56) References Cited

U.S. PATENT DOCUMENTS

| | | |
|---|---|---|
| 6,810,518 B1 | 10/2004 | Grimaud |
| 6,898,786 B1 | 5/2005 | Sokolov |
| 6,966,054 B2 | 11/2005 | Simonyi |
| 7,065,742 B1* | 6/2006 | Bogdan ............... 717/106 |
| 7,089,543 B2 | 8/2006 | Rising |
| 7,219,338 B2 | 5/2007 | Venter |
| 7,581,206 B2 | 8/2009 | Saad |
| 7,779,020 B2 | 8/2010 | Grust |
| 7,836,428 B2 | 11/2010 | Mitchell |
| 7,895,584 B1 | 2/2011 | Ma |
| 7,904,877 B2 | 3/2011 | Multerer |
| 7,917,890 B2 | 3/2011 | Barcellona |
| 8,108,834 B2 | 1/2012 | Oren |
| 2002/0138819 A1* | 9/2002 | Hills ............... 717/114 |
| 2003/0167261 A1* | 9/2003 | Grust et al. ............... 707/3 |
| 2003/0208743 A1 | 11/2003 | Chong |
| 2004/0194072 A1 | 9/2004 | Venter |
| 2004/0230951 A1* | 11/2004 | Scandura ............... 717/120 |
| 2005/0165746 A1 | 7/2005 | Chakravarty |
| 2005/0203958 A1* | 9/2005 | Mitchell et al. ............... 707/104.1 |
| 2005/0246686 A1 | 11/2005 | Seshadri |
| 2006/0242382 A1* | 10/2006 | Griess et al. ............... 711/170 |
| 2007/0055978 A1 | 3/2007 | Meijer |
| 2007/0094647 A1* | 4/2007 | Meijer ............... G06F 8/437 717/140 |
| 2007/0124346 A1 | 5/2007 | Mitchel |
| 2007/0169039 A1 | 7/2007 | Lin |
| 2007/0234288 A1* | 10/2007 | Lindsey ............... G06F 8/72 717/117 |
| 2007/0245325 A1* | 10/2007 | Lapounov ............... G06F 8/437 717/140 |
| 2007/0256018 A1 | 11/2007 | Chatani |
| 2007/0277151 A1* | 11/2007 | Brunel ............... G06F 8/10 717/113 |
| 2008/0022267 A1 | 1/2008 | Johnson |
| 2008/0082961 A1* | 4/2008 | Adams ............... G06F 8/34 717/109 |
| 2008/0098370 A1 | 4/2008 | Fontoura |
| 2008/0148223 A1* | 6/2008 | Bhandarkar ............... G06F 8/427 717/106 |
| 2008/0178149 A1* | 7/2008 | Peterson ............... G06F 8/443 717/110 |
| 2008/0320453 A1* | 12/2008 | Meijer ............... G06F 8/423 717/140 |
| 2009/0150854 A1* | 6/2009 | Elaasar ............... G06F 8/10 717/104 |
| 2009/0150863 A1* | 6/2009 | Guo ............... G06F 8/437 717/116 |
| 2009/0150864 A1* | 6/2009 | Meijer ............... G06F 8/437 717/116 |
| 2009/0172637 A1* | 7/2009 | Parikh ............... G06F 8/60 717/114 |

OTHER PUBLICATIONS

Daniel C. Wang, The Zephyr Abstract Syntax Description Language, 1997, pp. 1-12.*

Frederic Jouault, Transforming Models with ATL, 2006, pp. 128-137.*

Sonia Estevez-Martin et al., "About Implementing a Constraint Functional Logic Programming System with Solver Cooperation", 2007, pp. 57-71.

Angelo Mottola, "Design and implementation of a declarative programming language in a reactive environment", Master's Thesis in Computer Engineering, 2004-2005, 173 pages.

Paris C Kanellakis, "Constraint Programming and Database Query Languages", Department of Computer Science Brown University Providence, Rhode Island, Jun. 1994, 27 pages.

Piero Fraternali, "Tools and Approaches for Developing Data-Intensive Web Applications: A Survey", Sep. 1999, 37 pages.

U.S. Appl. No. 12/244,998, Non-Final Office Action dated Dec. 7, 2011, 19 pages.

U.S. Appl. No. 12/244,998, Interview Summary dated Mar. 1, 2012, 3 pages.

U.S. Appl. No. 12/244,998, Amendment dated Jun. 5, 2012, 12 pages.

U.S. Appl. No. 12/244,998, Final Rejection dated Aug. 16, 2012, 22 pages.

U.S. Appl. No. 12/244,998, Interview Summary dated Dec. 28, 2012, 4 pages.

U.S. Appl. No. 12/244,998, Amendment After Final dated Feb. 8, 2013, 11 pages.

U.S. Appl. No. 12/244,998, Amendment After Final (initialed by Examiner), Feb. 25, 2013, 1 page.

U.S. Appl. No. 12/244,998, Notice of Allowability dated Feb. 25, 2013, 11 pages.

U.S. Appl. No. 12/244,998, Notice of Allowance and Examiner-Initiated Interview Summary dated Feb. 25, 2013, 6 pages.

Michael Hammer et al., "DIAL: A Programming Language for Data Intensive Applications", 1980, 18 pages.

Hannes Gassert et al., "From Graph to GUI: Displaying RDF Data from the Web with Arago", 2005, 10 pages.

M.J. Carey et al., "Towards Heterogeneous Multimedia Information Systems: The Garlic Approach", 1995, 8 pages.

* cited by examiner

| ORDER | BAR VALUE |
|---|---|
| 1 | A |
| 2 | B |
| 3 | C |

| ID | BAR VALUE |
|---|---|
| XXX | A |
| YYY | B |
| ZZZ | C |

COMMON INTERMEDIATE REPRESENTATION FOR DATA SCRIPTING LANGUAGE

CROSS-REFERENCE TO RELATED APPLICATIONS

This application is a continuation of U.S. patent application Ser. No. 12/244,998, filed Oct. 3, 2008, entitled "COMMON INTERMEDIATE REPRESENTATION FOR DATA SCRIPTING LANGUAGE," which is incorporated herein by reference in its entirety.

TECHNICAL FIELD

The subject disclosure generally relates to a common intermediate representation for a data scripting language.

BACKGROUND

By way of general background, scripting languages are programming languages that control software systems, applications and programs. Scripts are often treated as distinct from "programs," which execute independently from other applications. In addition, scripts can be distinct from the "core code" of an application, which may be written in a different language. Scripts can be written by developers or other programs, in source formats or object formats, which range the gamut in terms of human friendly or machine friendly, or neither. Where accessible to the end user, scripts enable the behavior of an application to be adapted to the user's needs. Scripts can also be interpreted from source code or "semi-compiled" to bytecode, or another machine friendly format, which is interpreted. Scripting languages can also be embedded in an application with which they are associated.

In one programming context, a developer, i.e., a human being, creates text that defines a source code, a compiler translates the language to a machine friendly format for the given platform. In that context, there are a variety of debugging tools and integrated development environments (IDEs) available to the developer for writing bug-free text defining the source code. However, in other programming contexts, applications or the machines themselves can generate code for execution across data stores, involving no human being at code generation time. For instance, an application might generate code automatically to query a certain data store according to dynamic parameters that frequently change and thus are unknown until code generation time. In this and other cases involving machine generated code, the code need not be created or tested in a human friendly "source code" format since a human need not be involved. Accordingly, an efficient, simple and logical technique for generating and testing machine generated code represented directly in machine friendly format is desirable.

In this regard, there are a variety of scenarios in which it is desirable to directly represent code in an intermediate machine friendly format without going through the process of generating source text. For instance, another system, application or program may create the code, and in such case, it can be beneficial to create and store the programming constructs of the code according to such an intermediate format for future reference, or modification, augmentation, referencing, versioning, etc. In this respect, it would be more efficient to be able to "plug" data representing the programmatic constructs as directly generated or pre-stored according to the intermediate format so that many of the compilation steps implicated with source text can be skipped.

By way of further background, relational databases have evolved for the purpose to organize large numbers of records and fields, and have been used for such large scale data collection, and various query languages and other domain specific languages have developed which instruct database management software to retrieve data from a relational database, or a set of distributed databases, on behalf of a querying client or application. Yet, by and large, due to the specific purposes for which such languages were developed and the context in which they were meant to operate, among various domain specific limitations, such languages, in a nutshell, have failed to provide sufficient generality and have elevated the importance of syntactically complex constructs. Moreover, query languages and programs are typically developed in native source code without providing intuitive direct access to intermediate object code surfaces. For instance, transact structured query language (T-SQL) programming constructs tend to be difficult to comprehend even in native programming language syntax.

There have been some prior attempts at direct generation of intermediate object formats without requiring original developer source code. For instance, the Document Object Model (DOM) is a programming interface for hypertext markup language (HTML) and extensible markup language (XML) documents. A DOM defines the way a document can be accessed and manipulated. Using a DOM, a programmer can create a document, navigate its structure, and add, modify, or delete its elements. As a world wide web consortium (W3C) specification, one objective for the DOM has been to provide a standard programming interface that can be used in a wide variety of environments and applications, being designed to be used with any programming language.

An XML parser can be used to load an XML document into the memory of a computer. When the document is loaded, its information can be retrieved and manipulated by accessing the DOM, representing a tree view of the XML document. Without going into great detail, the documentElement is the top-level of the tree, having one or many childNodes that represent the branches of the tree. A Node Interface is used to read and write (or access) the individual elements in the XML node tree. The childNodes property of the documentElement can be accessed to enumerate each individual node. An XML parser having DOM support should provide all the necessary functions to traverse the node tree, access the nodes and their attribute values, insert and delete nodes, and convert the node tree back to XML. Some of the commonly used node types include: Document type, Processing instruction, Element, Attribute and Text.

In this regard, XML DOM is an example of a conventional attempt to allow data intensive applications to be created and analyzed in a machine accessible format via the creation and interpretation of the tree view of the XML document. However, XML DOM is based on an underlying data model and type system that occludes or obscures the target domain, thereby limiting its reach and generality.

Accordingly, when a large amount of data is stored in a database, such as when a set of server computers collect large numbers of records, or transactions, of data over long periods of time, other computers and their applications may sometimes desire access to that data or a targeted subset of that data via one or more scripts. In such case, the other computers can query for the desired data, read or write to the data, update the data, or apply any other processing to the data, via one or more methods of a variety of conventional query languages. The amount of data being voluminous in such circumstances, the applications for consuming the data have become quite data intensive. Thus, being able to directly generate and store programming constructs of a programming language in an intermediate format according to intuitive and general purpose constructs that are not mired in underlying systemic limitations would greatly facilitate the goals around efficient automatic generation of object code.

The above-described background information and deficiencies of current systems are merely intended to provide an overview of some of the background information and problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Embodiments of a common intermediate representation for a data scripting language are provided for an efficient representation of programming constructs in memory. The common intermediate representation of data scripts allows data intensive applications to be created and analyzed in a machine accessible format, and the elements of the common intermediate representation can be stored independent of underlying storage specifics. Stored elements of the common intermediate representation of code are thus available for loading in memory when desired by other applications and programs by mapping the stored elements to the in memory intermediate representation in an intuitive manner.

For instance, systems, applications and programs may access, modify, version code represented in the intermediate format, and intermediate representations stored can be cross-referenced by other intermediate representations to build more complex or better programs over time. In one non-limiting embodiment, the common intermediate representation is for a declarative programming language, such as the M programming language, following a constraint based typing system and an unordered execution model. In one non-limiting aspect, the intermediate representation includes a property-centric programming surface. In another non-limiting aspect, attached properties are leveraged to augment the common intermediate representation of programs with additional information, such as additional state information associated with the program specifications.

These and other embodiments are described in more detail below.

BRIEF DESCRIPTION OF THE DRAWINGS

Various non-limiting embodiments are further described with reference to the accompanying drawings in which:

FIG. 14 is an illustration of data storage according to an ordered execution model;

FIG. 15 is a non-limiting illustration of data storage according to an order-independent execution model;

DETAILED DESCRIPTION

Overview

Figure 1:
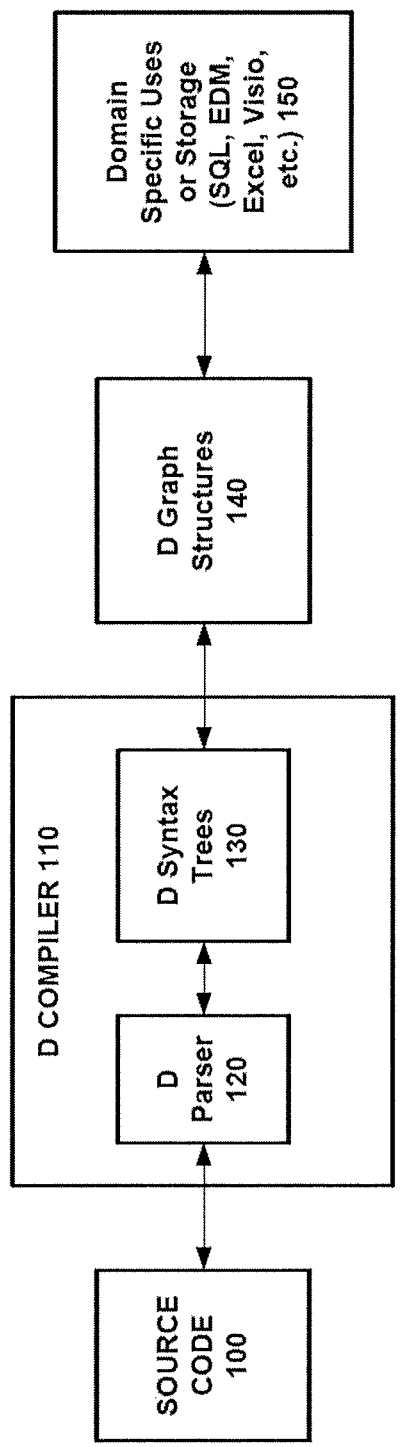
FIG. 1 is a block diagram of a compiling process chain for a declarative programming language and related structures.

As discussed in the background, among other things, conventional systems for achieving direct manipulation of intermediate machine representations of code have been limited and complex. For instance, XML DOM systems are based on an underlying data model and type system that occludes or obscures the target domain, and thus introduces complexity and narrower applicability to the generation and representation of data intensive applications and code. Moreover, large quantities of data are being stored everywhere, and the need for access to that data by a variety of data-centric applications, such as email, spreadsheets, financial applications, etc., in machine readable format according to a variety of dynamic data is a real problem faced by the data processing world today.

In part consideration of limitations of prior attempts, and in part leveraging the advantages of a declarative programming language, such as the M programming language developed by Microsoft (or "M" for short), various non-limiting embodiments of a common intermediate representation for a declarative programming language are described herein. In the various embodiments, the common intermediate representation can be used directly for generating data processing applications and code, e.g., programs or scripts can be represented directly according to one or more abstract syntax tree (AST) or directly as a semantic graph. For instance, a spreadsheet application or an extensible linking language (XLL), or other program or application, might generate code that specifies a specific algorithm to be applied over a data store. In such case, with the embodiments described herein, the code can be specified directly in a commonly understood intermediate and machine friendly format in memory for computing systems and applications.

In one beneficial aspect, certain compilation steps implicated when a developer codes the program in source code, such as parsing of the text, can be avoided. In another non-limiting aspect, the data representing the code according to the common intermediate representation can be stored in any underlying storage abstraction, and be re-loaded to the intermediate representation in memory for re-use, modification, versioning, etc. of the code represented by the intermediate representation. Thus, the common intermediate representation of the programming constructs of code or scripts of a declarative programming language as described herein provides a common base of code that can be built upon, like libraries, and tailored over time to the evolving needs of a data processing system without re-writing all of the code, or re-compiling any code since direct manipulation in memory is possible.

Data intensive applications can thus be created and analyzed in a machine accessible format, such as in an AST or semantic graph format. M is a programming language designed by Microsoft that is well suited to author data intensive programs. In various non-limiting embodiments described herein, code can be developed directly to an in-memory representation of the language. In various non-limiting embodiments, systems, applications and programs can generate and automatically validate code in machine accessible format as well. In one embodiment, the common intermediate representation exposes a property-centric programming surface for M programs that facilitates generating code based directly on the common intermediate representation.

In other embodiments, applications, programs, developers, etc. can directly specify or modify attached properties for M abstract syntax trees or M graphs in order to represent additional or modify state of one or more nodes of the underlying structures. The state might include information used to analyze or validate that the code does not include inconsistencies or other errors. For instance, typechecking data, stored as attached properties to the abstract syntax trees, can be directly specified or modified according to the common intermediate representation for a declarative scripting language herein.

The M Intermediate Representation (MIR) is an in-memory representation of M modules. MIR is a data-oriented object model and is designed for simple construction using object initialization syntax that has a high degree of correspondence to the syntax of an M compilation unit. Types in the MIR consist solely of properties that represent elements of an M compilation unit, with no intrinsic behavior. All behavior (type checking, name resolution, code generation) is implemented as methods that are external to the MIR and accept MIR graphs as input.

The MIR is designed to embrace the XAML data model and format. To that end, the MIR takes advantage of attached properties to allow additional information to be efficiently associated with nodes in an MIR graph. These attached properties are then made available to XAML engines to support serializing intermediate state of the M compilation process into a persistent/transmissible form.

Accordingly, in various non-limiting embodiments, the present invention provides a common intermediate representation for a declarative data scripting language, such as the M programming language. The M programming language is provided as the context for various embodiments set forth herein with respect to the generation of and direct manipulation of M abstract syntax trees or M graph structures in memory.

However, it can be appreciated that the various embodiments described herein can be applied to any declarative programming languages having the same or similar capabilities of M with respect to its programming constructs and other defining characteristics. In this regard, it is often desirable to author source code in a declarative programming language, often considered the counterpart to imperative programming languages. Unlike imperative programming languages, declarative programming languages allow users to write down what they want from their data without having to specify how those desires are met against a given technology or platform. Purely declarative languages, in general, do not "compute" anything; rather, they specify relationships, which can be used to perform computation.

In this regard, the M programming language, more details about which can be found below, is a declarative programming language that is well suited to compact and human understandable representation and advantageously includes efficient constructs for creating and modifying data intensive applications, independent of an underlying storage mechanism, whether flash storage, a relational database, RAM, external drive, network drive, etc. "M" is also sometimes called the "D" programming language, although for consistency, references to D are not used herein.

M includes an efficient and compact syntax for generating declarative source code. In this regard, the programming constructs of M can also be represented efficiently and directly as semistructured graph data based on one or more abstract syntax trees generated for a given source code received by a compiler, or generated directly according to the embodiments set forth herein. In this regard, due to the human friendly nature of the syntax for the semistructured graph data, applications and developers are not required to form actual source code since the semistructured graph data can be specified directly.

In this regard, based on a set of declarative programming constructs, or another specification of an M program, a set of ASTs or an M Graph (a semantic graph representation of an M program) can be formed that efficiently and directly represents the programming constructs of the M program. The properties supported in the syntax of M contribute to the formation of simpler AST and M Graph structures that are understandable to machines. At the same time, the structures are understandable to humans based upon visual inspection of a textual representation of M Graph structures, since the declarative expressions and corresponding programming constructs are intuitive, avoiding the downsides of conventional abstruse textual representations of trees/graphs.

Common Intermediate Representation for Data Scripting Language

As mentioned, in various non-limiting embodiments, the present invention provides an intermediate machine readable format for specifying and representing declarative programming code. In some embodiments, the common intermediate format refers to abstract syntax tree structures for a declarative programming language. In other embodiments, the common intermediate format can refer to semantic graph structures. In either case, it is understood that semantic graph structures can be created from abstract syntax tree structures, and vice versa.

A general block diagram system illustrating different ways that M programs can be represented and used is shown in the compilation chain of FIG. 1. For instance, source code 100 can be authored directly by developers, or machines. Source code 100 can be compiled by an M compiler 110 including, for instance, an M parser 120 for parsing source code 100 and an M Syntax Tree component 130 for forming M Syntax Trees, which can then be analyzed and transformed to M Graph structures 140.

M Graph structures 140 can be generated by developers directly, and also by applications, and represented in a compact manner based on some features supported by M Graph structures. M Graph structures 140 can be unwound to trees 130 and back to source code 100, and M Graph structures 140 can be compiled or semi-compiled to object code in connection with data intensive applications according to various domain specific uses 150, such as SQL database queries, enterprise data management (EDM), spreadsheet applications, graphics applications, i.e., anywhere that data can be stored and analyzed. In this regard, two features of M Graph structures 140 that have not previously been realized include support for conformance relation (also known as factored definitions) and lexical resolution of identifiers or references.

Figure 2:
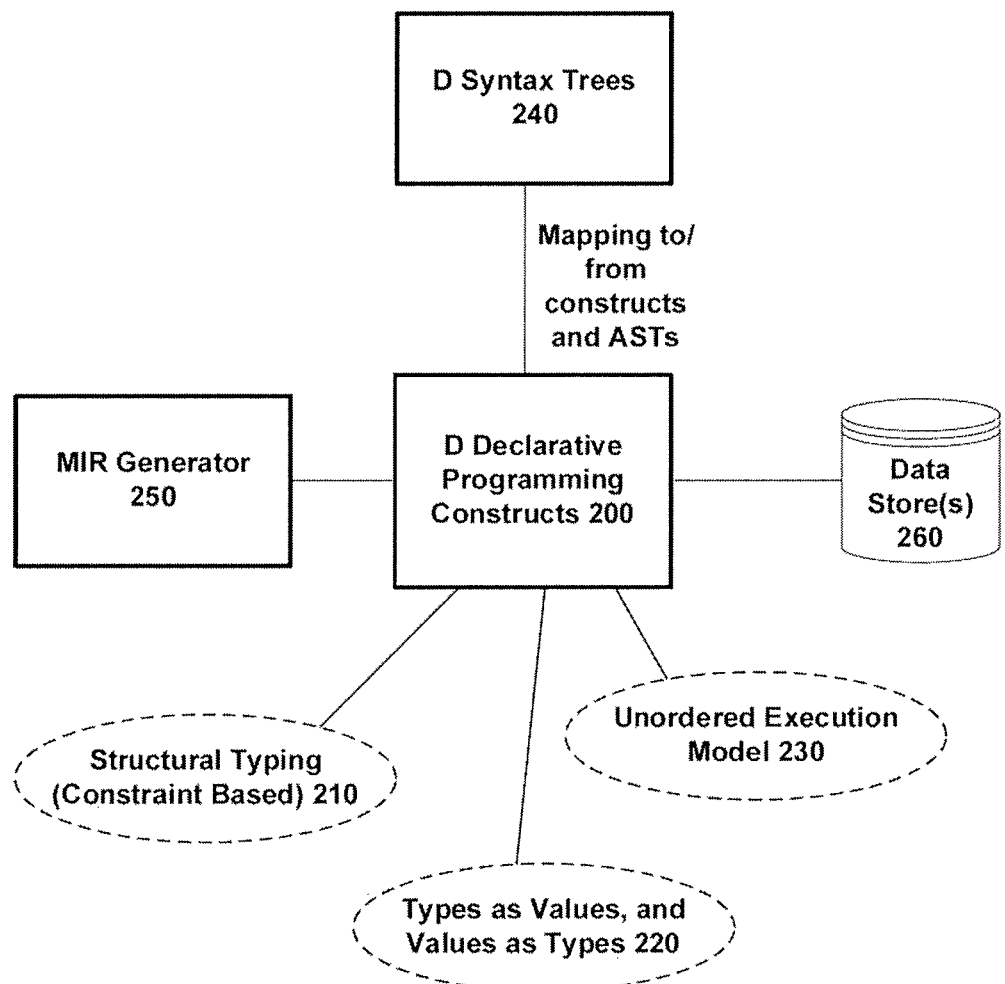
FIG. 2 is a block diagram illustrating the direct development of M syntax trees as a common intermediate representation.

FIG. 2 is a block diagram generally illustrating a first embodiment herein. Specifically, a system is illustrated in which programming surfaces for M programs are exposed for generation, manipulation, execution, etc. in the native intermediate machine language format, i.e., the system enables a property-centric programming surface for M programs that does not require native source M text. As shown, the ease of expressing M declarative programming constructs 200 is a foundation of the present embodiment. Characteristics of constructs 200 and the declarative programming model includes structural typing or constraint based typing 210, the ability to express types as values and values as types 220 and an unordered execution model 230 in that M declarative code is not concerned with the exact when and how data is stored, processed, etc., i.e., such order is not specified explicitly according to any order in the declarative code itself.

The M declarative programming constructs 200 can be mapped to M syntax trees directly in the present embodiment. For instance, an external application 250 can specify or modify M programming constructs 200 of M syntax trees 240. The information about the constructs 200 defining the M syntax trees 240 can also be stored in data stores 260.

Figure 3:
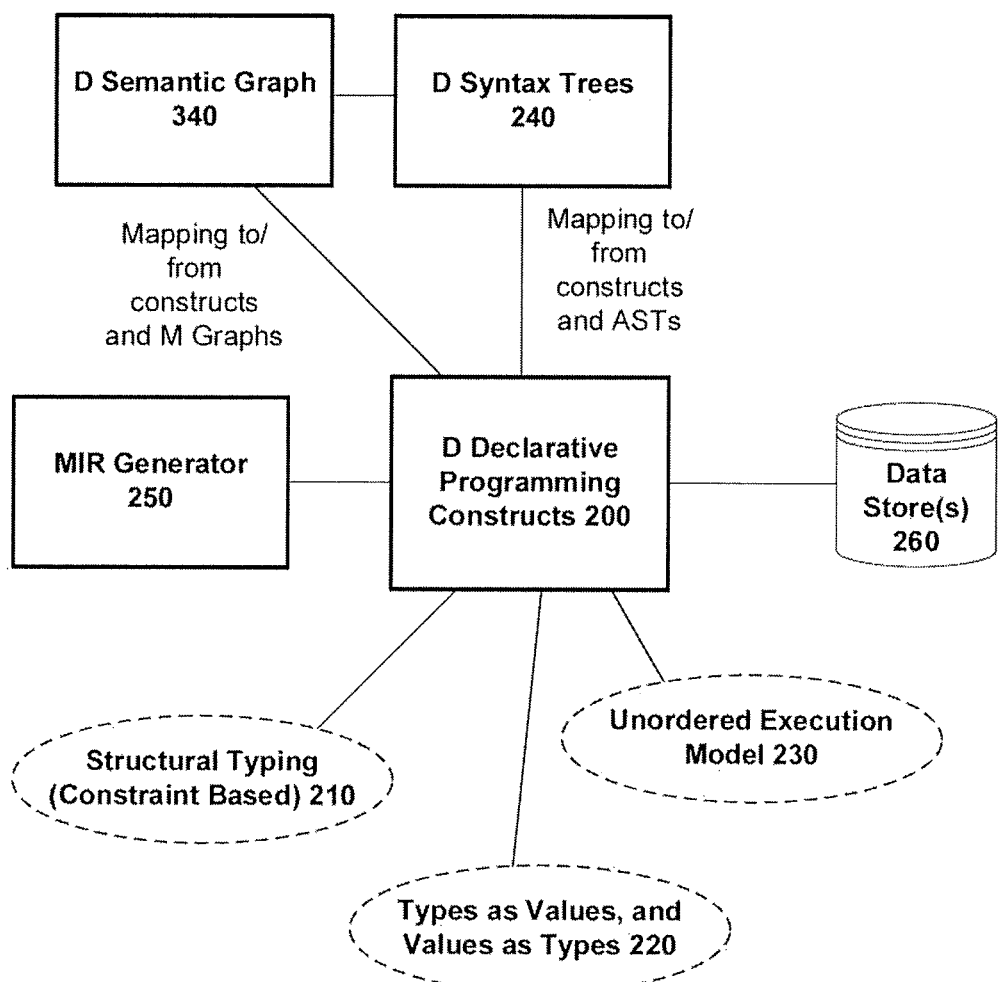
FIG. 3 is another block diagram illustrating alternately directly developing M semantic graphs as a common intermediate representation.

As shown by FIG. 3, in addition to mapping programming constructs 200 to and from M syntax trees 240 as an intermediate representation, an embodiment can also be implemented in which M semantic graphs 340 are the common intermediate representation for generation and manipulation of programming constructs. The use of M syntax trees 240 as the common intermediate representation can be more practical, though the embodiments herein are not so limited. In either case, equivalent representations can be formed through transforming ASTs to semantic graphs, or vice versa.

The idea of programming surfaces establishes a useful reference for situations where application code is developed away from the real target. Programming surfaces behave as an interface between underlying machine level code and an application language layer, or between the application language layer and the application itself. The idea of surfaces is useful for the demarcation of various elements of a system, which, if the surfaces can be proven equivalent, allow easy movement of segments of code from one platform to another.

In this regard, programming surfaces are useful, for instance, when the underlying processor platform goes out of production and is replaced by a similar item of hardware. Or, with respect to the common intermediate representation of declarative programming scripts as provided herein, the underlying storage vehicle is allowed to be independent of the language in which the data intensive application is expressed. As long as machine-level to application language level interface surfaces are shown equivalent, the substitution can be achieved.

Figure 4:
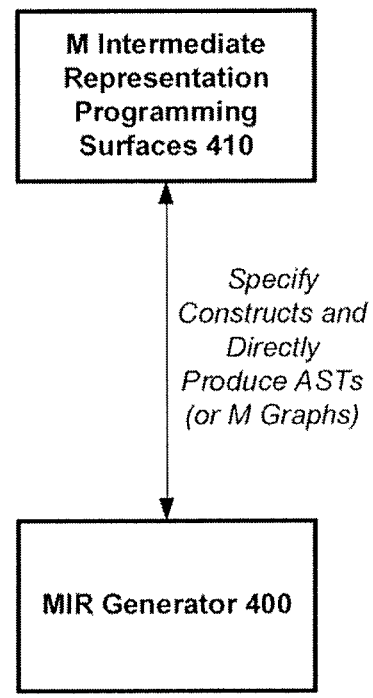
FIG. 4 is a block diagram illustrating a non-limiting aspect of representing code directly to an intermediate format as described for one or more embodiments herein.

Accordingly, as shown in FIG. 4, an M intermediate representation generator 400, which is any software, platform or system that can specify the M programming constructs as described above, enables the specification of such programming constructs directly to M intermediate representation programming surfaces 410.

Figure 5:
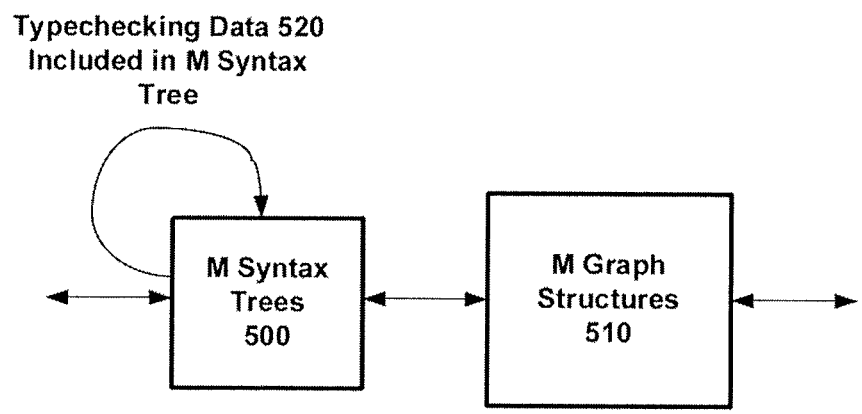
FIG. 5 is a block diagram illustrating another non-limiting aspect of representing code directly to an intermediate format as described for one or more embodiments herein.
Figure 6:
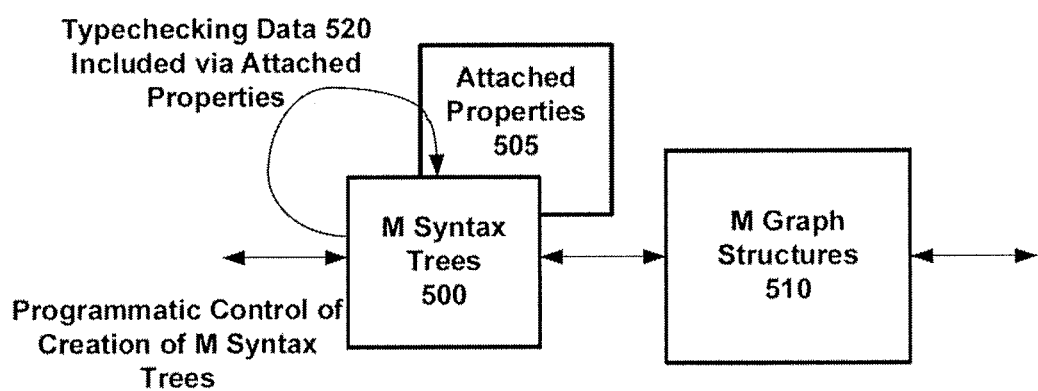
FIG. 6 is a block diagram illustrating another non-limiting aspect of representing code directly to an intermediate format as described for one or more embodiments herein.

FIG. 5 is a block diagram illustrating an exemplary typechecking process that is applied in accordance with the M programming language. In this regard, as mentioned, the direct specification and manipulation of node information represented by M syntax trees 500 is enabled. With M, a typechecking process is applied on the M syntax trees 500 to form typechecking data 520 that helps confirm that valid programming constructs are present. This typechecking data 520 is advantageously included in the M syntax tree structures 500, which can then be transformed to M graph structures 510. FIG. 6 illustrates attached properties 505 as one vehicle to achieve augmentation of the node information included in the M syntax trees 500. Attached properties 505 can also be the vehicle for including typechecking data 520 in the M syntax trees 500. FIG. 6 thus illustrates the use of attached properties for associating additional state with program specifications in one embodiment.

In another embodiment, attached properties can also be used on the ASTs, or semantic graphs, for comments in the original source text. In this regard, comments from original source text can be represented in the intermediate structures so that the comments can be unwound back to source code from intermediate representations of the code. Thus, attached properties on ASTs can be used in a variety of ways.

Figure 7:
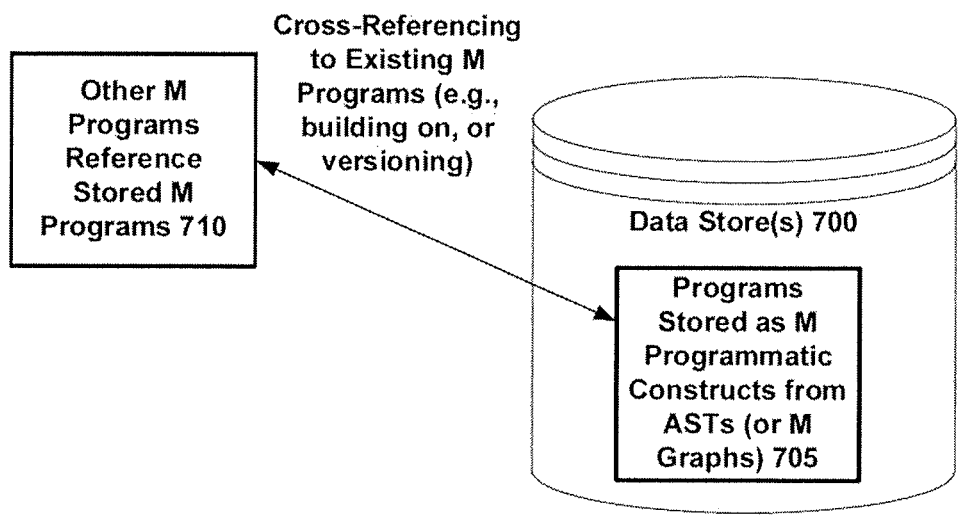
FIG. 7 is a block diagram illustrating a non-limiting advantage of representing M programs efficiently in a common intermediate format.

FIG. 7 illustrates a non-limiting benefit from being able to control M intermediate language representations programmatically and directly. Specifically, since trees or graph structures associated with data intensive applications will tend to proliferate in a data intensive computing environment, which can be distributed, rather than store programming constructs directly in every repeated instance, references to other trees or graph structures can be employed. Since, wherever retrieved, the tree or graph information is loaded in memory by the executing device or application, a reference to a tree achieves the same objective as a copy. Similarly, trees and graphs can also be thought of as building on or derivative of other pre-existing trees and graphs, and thus references to the building blocks of other trees or graphs can facilitate the efficient construction and storage of M programs. In this regard, external systems, applications or programs 710 can store M scripts or programs by storing directly, or referencing other sets of programmatic constructs from other ASTs (M Graphs) 705, which can be stored in any one of a set of diverse or distributed storage abstractions 700, local or networked.

Figure 8:
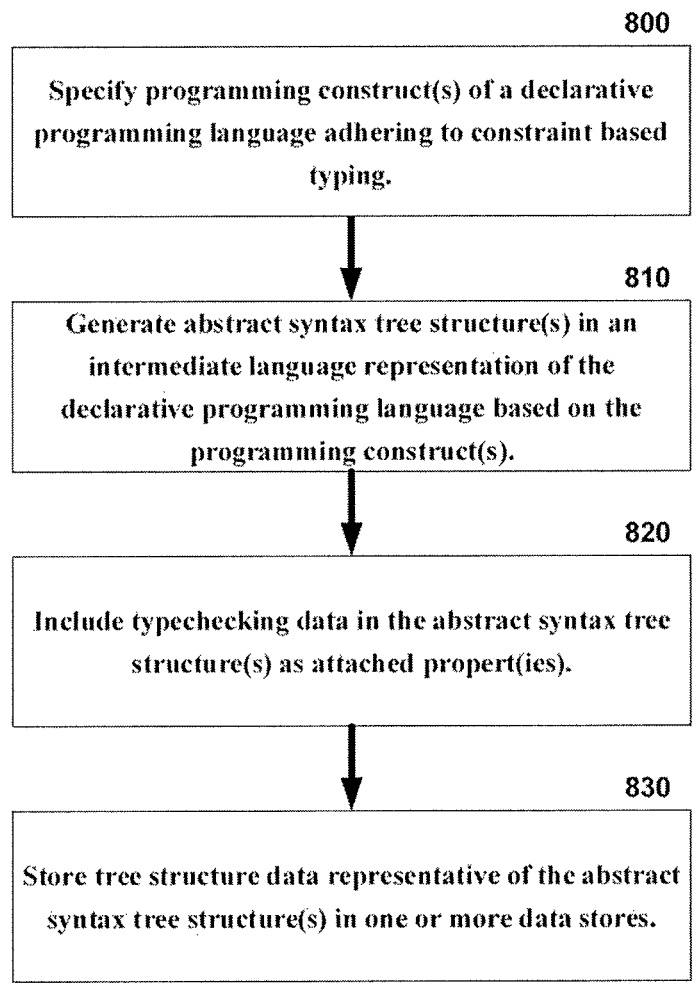
FIG. 8 is a flow chart illustrating an exemplary non-limiting process for specifying abstract syntax trees of a declarative program directly.

FIG. 8 is a flow diagram illustrating a process for defining declarative code in an intermediate machine readable representation. At 800, programming constructs of a declarative programming language are specified. In one aspect, each type associated with the programming constructs is defined as a function of zero or more constraints on a limitless type, e.g., any type. Additional state information about the programming constructs can be included in the abstract syntax tree structures as attached properties.

At 810, based on the plurality of programming constructs, abstract syntax tree structures are generated in a machine readable intermediate language representation of the declarative programming language. In this regard, at 820, typechecking data can be included in the at least one abstract syntax tree structure as attached properties. The generating can also include referencing at least one other abstract syntax tree structure, modifying at least one node of a pre-existing abstract syntax tree structure, or versioning at least one node of a pre-existing abstract syntax tree structure. At 830, the tree structure data representative of the abstract syntax tree structures can be stored in one or more data stores.

Figure 9:
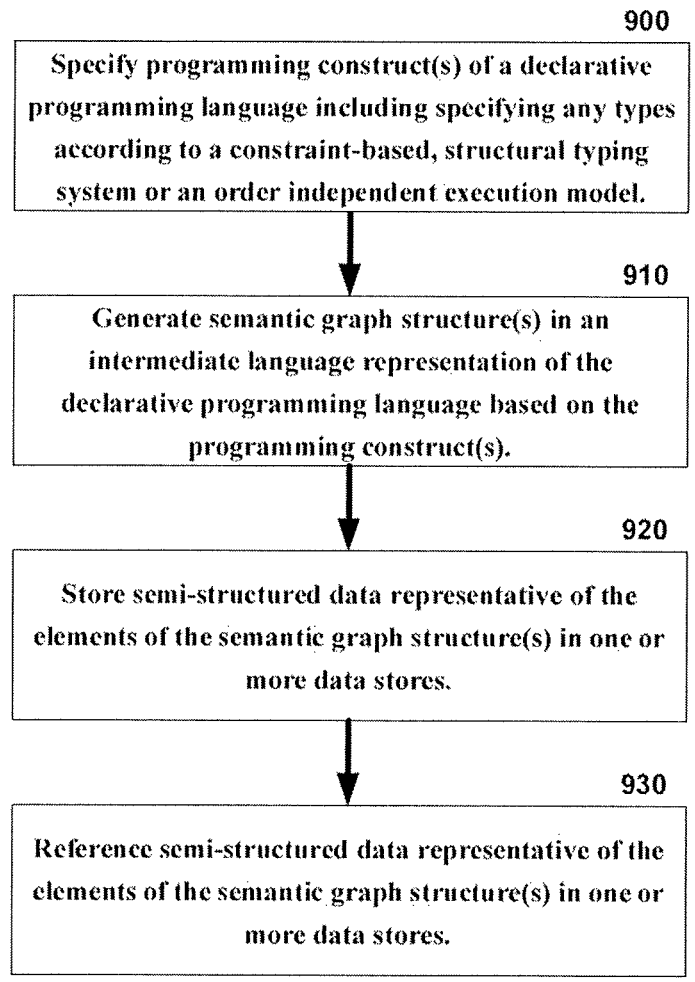
FIG. 9 is a flow chart illustrating an exemplary non-limiting process for specifying semantic graphs of a declarative program directly.

FIG. 9 is a flow diagram illustrating a process for defining declarative code in an intermediate machine readable representation. At 900, programming constructs of a declarative programming language are specified where the declarative programming language includes types defined according to a constraint-based, structural typing system. Additional state information can be specified about the programming constructs and represented in semantic graph structures as attached properties.

At 910, based on the specified programming constructs, as an optional alternative to representing the programming constructs as abstract syntax trees, semantic graph structures are generated in a machine readable intermediate language representation of the declarative programming language. Typechecking data constructed over types of the programming constructs can be included in the semantic graph structures as attached properties. At 920, the semi-structured data representative of the semantic graph structures can be stored in one or more data stores, or can be referenced in one or more data stores as shown at 930.

Figure 10:
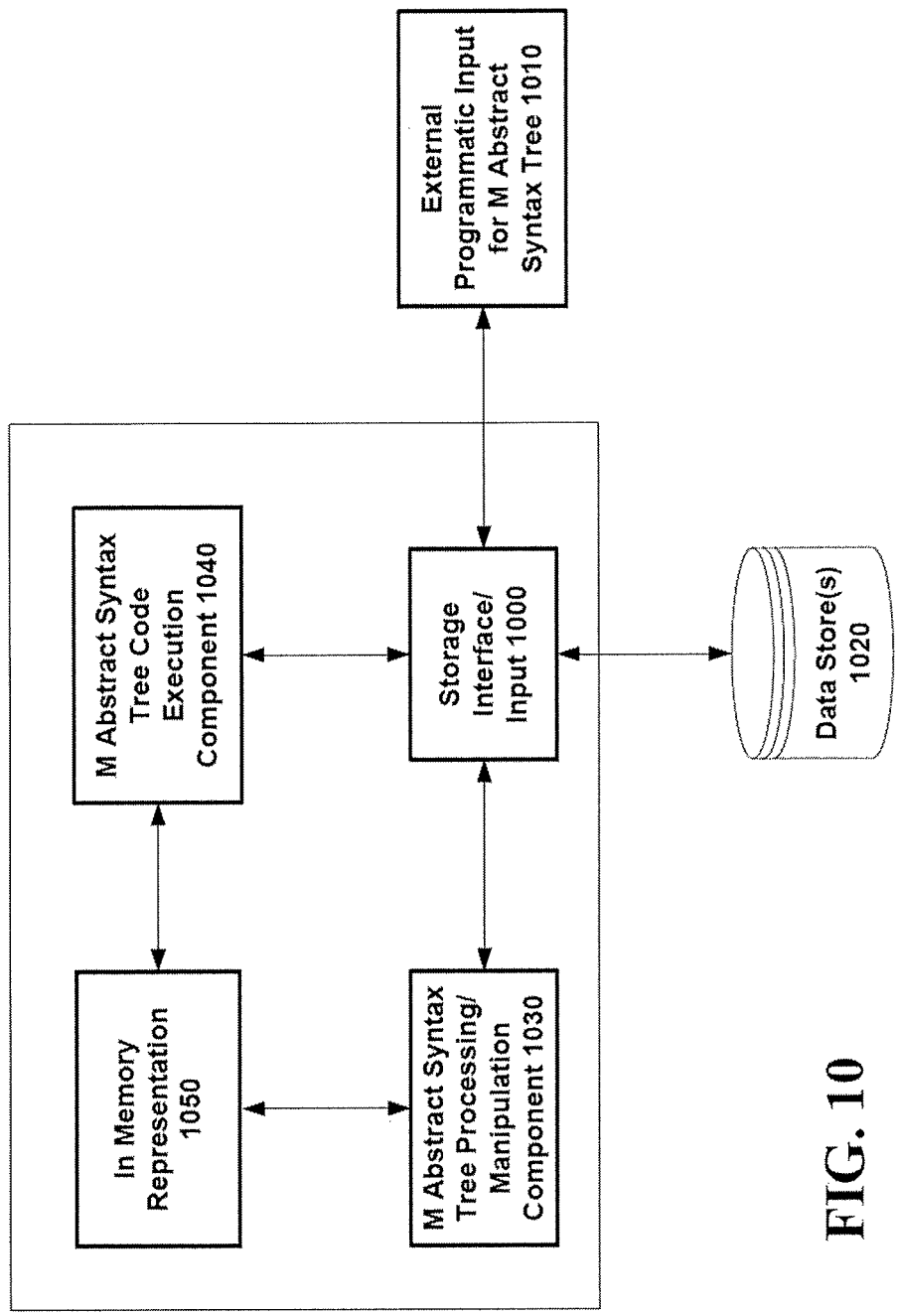
FIG. 10 is a block diagram illustrating a system for consuming, manipulating, executing and/or storing programmatic constructs of a declarative programming model in accordance with embodiments.

FIG. 10 is an exemplary, non-limiting block diagram illustrating a computing system for executing declarative code based on a specification of a common intermediate representation of a declarative programming language. The system includes a storage interface/input/output mechanism 1000, which can receive a definition of programmatic elements of M abstract syntax tree representations. With the M programming language, the declarative programming language adheres to an order independent execution programming model, and also of unique benefit in this programming model context, types can have values and values can have types. The interface 1000 can also receive programming constructs as stored in data store(s) 1020. Advantageously, external systems and applications can specify M programs according to programmatic input for representing M syntax trees 1010.

In this regard, the M programs are reduced to an in memory representation 1050 of the abstract syntax trees, which is generated by AST processing component 1030. The representation 1050 can also be modified with AST processing component 1030. Furthermore, representation 1050 can be efficiently transformed to executable or executing code by AST code execution component 1040. Abstract syntax tree manipulation/processing component 1030 thus exposes the programmatic elements represented by the abstract syntax tree data structures to at least an external developer or a third party application for direct generation or modification of the abstract syntax tree data structures. The programmatic elements represented by the abstract syntax tree data structures can be augmented with state information via attached properties.

Exemplary Declarative Semantic Graph Structures

While the embodiments described above can be applied to abstract syntax trees or semantic graph structures, some supplemental context regarding semantic graph structures for the declarative programming model of the M programming language is now provided. Some additional context for M syntax trees is also provided.

Compared to a syntax tree, identifiers in a semantic graph are bound, and types are resolved. For instance, this M source:

```
module M {
    E = 1;
    F = E;
}
``` is parsed into a syntax tree equivalent to this one, which can be directly specified as described above:

```
var unit = new CompilationUnit {
    Members = {
        new ModuleDeclaration {
            Name = "M",
            Members = {
                new ExtentDeclaration {
                    Name = "E",
                    InitialValue = new Literal {
                        Kind = LiteralKind.Integer8,
                        Value = 1,
                    },
                },
                new ExtentDeclaration {
                    Name = "F",
                    InitialValue = new DeclarationReference { Name = "E" },
                },
            },
        },
    },
}
```

Then, after semantic analysis, i.e., type checking, the above syntax tree may be converted to a semantic graph using the ToSymbol extension method:

var P=unit.ToSymbol( );

The resulting semantic graph is equivalent to the one below, where Integer32 is bound to the representation of the built-in type for 32-bit integers (line numbers for descriptive purposes only, not part of the semantic graph definition):

```
var E = new Extent {              // Line 1
    Name = "E",
    InitialValue = new Constant {
        Type = Integer32,
        Value = 1,
    },
    Type = Integer32,             // Line 7
};
var P = new Program {
    Modules = {
        new Module {              // Line 11
            Name = "M",
            Members = {
                E,
                new Extent {
                    Name = "F",
                    InitialValue = new VariableReference { Variable = E },   // Line 17
                    Type = Integer32,                                        // Line 18
                },
            },
        },
    },
};
```

It is noted that the initial value of the second extent (Line 17) is a variable reference that is bound to the first extent (Line 1) and that the types for both extents have been resolved to Integer32 (Lines 7 and 18).

Semantic graph nodes have a Parent property whose value is the node's container, following the original syntax tree structure. For example, the Parent of E (Line 1) is the Module M (Line 11). To avoid visual clutter, the Parent property left out of various examples throughout this section. Nodes are mutable objects that have default public constructors, public get/set properties, and a corresponding set of interface definitions. Since identifiers have been bound in a semantic graph, Name properties are not semantically meaningful.

In this regard, the conversion from a tree to a graph as illustrated above involves atomizing shared nodes, such as the first extent (Line 1) in the example above.

In another non-limiting aspect, a semantic graph normalizes syntactic variations. For example, this M source contains two module declarations with the same name:

```
module M {
    E = 1;
}
module M {
    F = E;
}
```

The corresponding syntax tree has two ModuleDeclarations, but the semantic graph is the same as the one shown above.

Similarly, a semantic graph resolves intersection and union of types. For example, this source includes an intersection type S:

```
module M {
    type T {
        E : Integer;
        F : Text;
    }
    type S : T {
        E : Integer32;
        G : Logical;
    }
}
```

The corresponding semantic graph is equivalent to this one, where Integer, Text, Logical, and Entity are bound to the representation of those built-in types:

```
var F = new Extent { Name = "F", Type = Text };
var G = new Extent { Name = "G", Type = Logical };
var FieldNames = new ComputedValue {              // Line 3
    Name = "FieldNames",                          // Line 4
    ResultType = new CollectionTypeSymbol {       // Line 5
        Name = "$CollectionType$1",               // Line 6
        Primitive = Collection,                   // Line 7
        ElementType = Text,                       // Line 8
        Members = {                               // Line 9
            // ComputedValues on Language.Collection elided   // Line 10
        },                                        // Line 11
    },                                            // Line 12
},                                                // Line 13
var P = new Program {
    Modules = {
        new Module {
            Name = "M",
            Members = {
                new EntityTypeSymbol {
                    Name = "T",
                    Primitive = Entity,           // Line 21
                    Members = {
                        new Extent { Name = "E", Type = Integer },
                        F,
                        FieldNames,               // Line 25
```
```
                    },
                },
                new EntityTypeSymbol {
                    Name = "S",
                    Members = {
                        new Extent { Name = "E", Type = Integer32 },
                        F,
                        G,
                        FieldNames,
                    },
                },
            },
        },
    },
};
```

It is noted that the Primitive property of the EntityTypeSymbol for the type named "T" (Line 21) above contains a reference to the built-in type Language.Entity. The members of this EntityTypeSymbol include those appearing in the syntax tree above as well as those from Language.Entity (Line 25). In particular, this includes the ComputedValue "FieldNames" defined earlier in the example (Lines 3-13) that returns a collection of zero or more Text, as indicated by the CollectionTypeSymbol (Line 5) which has a synthesized name (Line 6), whose underlying primitive type is Collection (Line 7), whose element type is Text (Line 8), and which has the default of zero for minimum and unbounded for maximum. A semantic graph also merges partial extent declarations into a single extent.

To indicate the derivation of a semantic graph node, a semantic graph node may have a Sources attached property containing a list of syntax tree node(s) from which the semantic graph node was constructed. By default, the Sources property is populated. However, this information may be unwanted in scenarios where a "bare" semantic graph is implicated, e.g., in an image file representing partial compilation. To eliminate these pointers from the semantic graph back into the syntax tree, the ToSymbol extension method can be called with a false argument:

var P=unit.ToSymbol(false);

If there are errors during parsing or semantic analysis, the resulting semantic graph may be invalid. One reasonable, but non-limiting, policy is to not compute a syntax tree if there are parsing errors and not to compute a semantic graph if there are semantic analysis errors. Alternatively, to generate a complete set of errors, it may be more appropriate to continue as many transformation steps as possible, e.g., by discarding nodes with errors.

In a well-formed and valid semantic graph, none of the node properties are null except where specifically noted below. (For example, the Parent property of the top-level Program node is/can be null.)

With respect to base types, a symbol is the base type for semantic graph nodes. A Symbol contains a pointer to its parent node in the semantic graph, mirroring the structure of the corresponding syntax tree.

```
public interface ITermSymbol : ITerm {
    ITermSymbol Parent { get; set; }
}
```

A Named node represents a declaration. The Name property is not semantically meaningful but must not be null.

```
public interface INamed : ITermSymbol {
    string Name { get; set; }
}
```

With respect to the relationship of an M Program to an M Module, a Program represents an entire program and has zero or more Modules. The Parent property of a Program is null.

```
public interface IProgram : ITermSymbol {
    IList<IModule> Modules { get; }
}
```

A Module contains zero or more ComputedValues, Extents, and/or types. Zero or more of these members may be exported; while imports in a syntax tree have been resolved by semantic analysis and are therefore not needed in the semantic graph, exports are needed to inform subsequent compilation episodes about the visibility of the enclosed members.

```
public interface IModule : INamed {
    IList<INamed> Exports { get; }
    IList<INamed> Members { get; }
}
```

An Extent represents allocated storage within a Module or within instances of an EntityTypeSymbol. If no value is provided when the storage is allocated, the expression in the InitialValue property is evaluated and used.

```
public interface IExtent : IVariable {
    IExpressionSymbol InitialValue { get; set; }
}
```

A variable represents a storage location.

```
public interface IVariable : INamed {
    IType Type { get; set; }
}
```

With respect to computed values, a ComputedValue represents a parameterized function with zero or more formal parameters, with an example as follows. The Body property may be null if the ComputedValue is defined externally.

```
public interface IComputedValue : INamed {
    IExpressionSymbol Body { get; set; }
    IList<IParameter> Parameters { get; }
    IType ResultType { get; set; }
}
```

A Parameter is a formal parameter for exactly one ComputedValue, with an example as follows.
public interface IParameter : IVariable { }
Expressions
An ExpressionSymbol represents an expression and therefore has a type, with an example as follows.

```
public interface IExpressionSymbol : ITermSymbol {
    IType Type { get; set; }
}
```

A Constant represents a primitive, literal value, with an example as follows.

```
public interface IConstant : IExpressionSymbol {
    object Value { get; set; }
}
```

A VariableReference represents retrieving the value of a variable. Both Extents and Parameters are referenced as VariableReferences.

```
public interface IVariableReference : IExpressionSymbol {
    IVariable Variable { get; set; }
}
```

An Invocation represents a call of a ComputedValue. The Target property is the ComputedValue to be called. Invocations have regular evaluation semantics, that is, the Arguments are evaluated and then passed to the ComputedValue. The first Argument is the 'this' pointer if the ComputedValue was defined within an entity type. An example of Invocation is as follows.

```
public interface IInvocation : IExpressionSymbol {
    IList<IExpressionSymbol> Arguments { get; }
    IComputedValue Target { get; set; }
}
```

Invocations also represent arithmetic, logical, and many other operator applications. In such cases, the Target property contains a ComputedValue representing the specific operator identified by semantic analysis. For example, when adding two Texts, the Target will contain a ComputedValue that represents Text concatenation.

A TypeAscription represents an explicit type ascription of a value to a type. The ascribed type is the type of the expression.

```
public interface ITypeAscription : IExpressionSymbol {
    IExpressionSymbol Expression { get; set; }
}
```

In this regard, like these illustrative examples, any M expressions or programming constructs can be mapped into a semantic graph or similarly to an abstract syntax tree.

With respect to types, a Type represents a set of values. Types have names that are either derived from type declarations in a syntax tree or automatically generated. It is noted that Type does not have a set of 'base' types; the Members are those that reflect any intersection and/or union of the syntax tree type declarations. The Primitive property references one of the types from the Language module. (See below for more details.)

```
public interface IType : INamed {
    IList<ITermSymbol> Constraints { get; }
    IList<INamed> Members { get; }
    IExternalTypeSymbol Primitive { get; set; }
}
```

As part of structural typing or constraint based typing of the M programming language, constrained types are represented by a list of specific constraints. Thus, two usages of a type declaration, one constrained differently from the other, will result in two type nodes in the semantic graph, one for each unique set of constraints.

An EntityTypeSymbol represents an entity type. The Primitive property references Language.Entity. The Members property contains zero or more ComputedValues or Extents, including those defined on Language.Entity. The Nullable property indicates whether references to this type may be null.

```
public interface IEntityTypeSymbol : IType {
    bool Nullable { get; set; }
}
```

A CollectionTypeSymbol represents a collection type. The Primitive property references Language. Collection. The Members property contains ComputedValues on Language. Collection. The MinCount property is a non-negative integer. The MaxCount property is at least the MinCount property. To represent an unbounded collection, MinCount is zero, and MaxCount property is null.

```
public interface ICollectionTypeSymbol : IType {
    IType ElementType { get; set; }
    int? MaxCount { get; set; }
    int MinCount { get; set; }
}
```

Also included is a representation of an 'infinite' collection type as suggested by the duality of types and values.

An ExternalTypeSymbol represents an externally-defined type that may be constrained or marked as nullable. The Primitive property references a type in the Language module; for example, a constrained Integer32 type would reference Language.Integer32. The Members property contains zero or more ComputedValues. The Nullable property indicates whether references to this type may be null.

```
public interface IExternalTypeSymbol : IType {
    bool Nullable { get; set; }
}
```

While the following examples do not show the corresponding construction of the M Syntax Tree, the programming constructs of the semantic graph map to constructs of the syntax tree according to similar semistructured data principles. Accordingly, these non-limiting examples are merely included illustrative of the simple declarative form and common intermediate representation of M semantic graphs, or similarly, of M syntax trees, as provided in the various embodiments herein. To clarify the mapping, some outer semantic graph nodes are elided.

| M | Semantic Graph |
|---|---|
| C() { 1 } | var C = new ComputedValue {<br>  Name = "C",<br>  Body = new Constant {<br>    Type = Integer32,<br>    Value = 1,<br>  },<br>  ResultType = Integer32,<br>}; |
| C(P : Integer32) { P } | var P = new Parameter {<br>  Name = "P",<br>  Type = Integer32,<br>};<br>var C = new ComputedValue {<br>  Name = "C",<br>  Parameters = { P },<br>  Body = new VariableReference {<br>    Variable = P,<br>    Type = Integer32,<br>  },<br>  ResultType = Integer32,<br>}; |
| C(P : Integer32)<br>{ P + 1 } | var P = new Parameter {<br>  Name = "P",<br>  Type = Integer32,<br>};<br>var C = new ComputedValue {<br>  Name = "C",<br>  Parameters = { P },<br>  Body = new Invocation {<br>    Target = Integer32.Add,<br>    Arguments = {<br>      new VariableReference {<br>        Variable = P,<br>        Type = Integer32,<br>      },<br>      new Constant {<br>        Type = Integer32,<br>        Value = 1,<br>      },<br>    },<br>    ResultType = Integer32,<br>  };|
| module M { } | var M = new Module {<br>  Name = "M",<br>}; |
| module M {<br>  C() { X }<br>  X() { 1 }<br>} | var X = new ComputedValue {<br>  Name = "X",<br>  Body = new Constant {<br>    Type = Integer32,<br>    Value = 1,<br>  },<br>  ResultType = Integer32,<br>};<br>var M = new Module {<br>  Name = "M",<br>  Members = {<br>    new ComputedValue {<br>      Name = "C",<br>      Body = new Invocation {<br>        Target = X,<br>        Type = Integer32,<br>      },<br>      ResultType = Integer32,<br>    },<br>    X,<br>  },<br>}; |
| module M {<br>  C() { X() }<br>  X() { 1 }<br>} | same |
| module M {<br>  C() { M.X }<br>  X() { 1 }<br>} | same |
| module M {<br>  C() { M.X() }<br>  X() { 1 }<br>} | same |
| module M {<br>  type T {<br>    C(P : Integer32)<br>    { P }<br>  }<br>} | var P = new Parameter {<br>  Name = "P",<br>  Type = Integer32,<br>};<br>var M = new Module {<br>  Name = "M",<br>  Members = { |

| M | Semantic Graph |
|---|---|
| | new EntityTypeSymbol { |
| |   Name = "T", |
| |   Primitive = Entity, |
| |   Members = { |
| |     new ComputedValue { |
| |       Name = "C", |
| |       Parameters = { P }, |
| |       Body = new VariableReference { |
| |         Variable = P, |
| |         Type = Integer32, |
| |       }, |
| |       ResultType = Integer32, |
| |     }, |
| |     new ComputedValue { |
| |       Name = "FieldNames", |
| |       // ResultType elided |
| |     }, |
| |   }, |
| | }, |
| | }; |
| module M { | var X = new ComputedValue { |
|   C(P : T) { P.X } |   Name = "X", |
|   type T { |   Body = new Constant { |
|     X() { 1 } |     Type = Integer32, |
|   } |     Value = 1, |
| } |   }, |
| |   ResultType = Integer32, |
| | }; |
| | var T = new EntityTypeSymbol { |
| |   Name = "T", |
| |   Primitive = Entity, |
| |   Members = { |
| |     X, |
| |     // FieldNames elided |
| |   }, |
| | }; |
| | var P = new Parameter { |
| |   Name = "P", |
| |   Type = T, |
| | }; |
| | var M = new Module { |
| |   Name = "M", |
| |   Members = { |
| |     new ComputedValue { |
| |       Name = "C", |
| |       Parameters = { P }, |
| |       Body = new Invocation { |
| |         Target = X, |
| |         Arguments = { |
| |           new VariableReference { |
| |             Variable = P, |
| |             Type = Integer32, |
| |           }, |
| |         }, |
| |         Type = Integer32, |
| |       }, |
| |       ResultType = Integer32, |
| |     }, |
| |     T, |
| |   }, |
| | }; |
| module M { | same |
|   C(P : T) { P.X() } | |
|   type T { | |
|     X() { 1 } | |
|   } | |
| } | |
| module M { | var M = new Module { |
|   type T : Integer32*; |   Members = { |
| } |     new CollectionTypeSymbol { |
| |       Name = "T", |
| |       Primitive = Collection, |
| |       ElementType = Integer32, |
| |       MinCount = 0, |
| |       Members = { |
| |         new ComputedValue { |

| M | Semantic Graph |
|---|---|
| |           Name = "Count", |
| |           ResultType = Unsigned, |
| |         }, |
| |         new ComputedValue { |
| |           Name = "Distinct", |
| |           ResultType = Collection, |
| |         }, |
| |       }, |
| |     }, |
| |   }, |
| | }; |
| module M { | var M = new Module { |
|   E = 1; |   Name = "M", |
| } |   Members = { |
| |     new Extent { |
| |       Name = "E", |
| |       InitialValue = new Constant { |
| |         Type = Integer32, |
| |         Value = 1, |
| |       }, |
| |       Type = Integer32, |
| |     }, |
| |   }, |
| | }; |
| module M { | var X = new ComputedValue { |
|   E = X; |   Name = "X", |
|   X() { 1 } |   Body = new Constant { |
| } |     Type = Integer32, |
| |     Value = 1, |
| |   }, |
| |   ResultType = Integer32, |
| | }; |
| | var M = new Module { |
| |   Name = "M", |
| |   Members = { |
| |     new Extent { |
| |       Name = "E", |
| |       InitialValue = new Invocation { |
| |         Target = X, |
| |         Type = Integer32, |
| |       }, |
| |       Type = Integer32, |
| |     }, |
| |   }, |
| | }; |
| module M { | var X = new Extent { |
|   export X; |   Name = "X", |
|   X; |   Type = Any, |
|   E; | }; |
| } | var M = new Module { |
| |   Name = "M", |
| |   Exports = { X }, |
| |   Members = { |
| |     X, |
| |     new Extent { |
| |       Name = "E", |
| |       Type = Any, |
| |     }, |
| |   }, |
| | }; |
| module M { | var M = new Module { |
|   C() { 1 } |   Name = "M", |
| } |   Members = { |
| module M { |     new ComputedValue { |
|   M() { 2 } |       Name = "C", |
| } |       Body = new Constant { |
| |         Type = Integer32, |
| |         Value = 1, |
| |       }, |
| |       ResultType = Integer32, |
| |     }, |
| |     new ComputedValue { |
| |       Name = "M", |
| |       Body = new Constant { |
| |         Type = Integer32, |
| |         Value = 2, |
| |       }, |

-continued

| M | Semantic Graph |
|---|---|
| | ResultType = Integer32, </br> }, </br> }, </br> }; |
| module M { </br>   export E; </br>   E : Integer32; </br> } </br> module N { </br>   import M; </br>   F = E; </br> } | var E = new Extent { </br>   Name = "E", </br>   Type = Integer32, </br> }; </br> var P = new Program { </br>   Modules = { </br>     new Module { </br>       Name = "M", </br>       Exports = { E }, </br>       Members = { E }, </br>     }, </br>     new Module { </br>       Name = "N", </br>       Members = { </br>         new Extent { </br>           Name = "F", </br>           InitialValue = </br>             new VariableReference { </br>               Variable = E, </br>               Type = Integer32, </br>             }, </br>           Type = Integer32, </br>         }, </br>       }, </br>     }, </br>   }, </br> }; |

Exemplary Declarative Programming Language

For the avoidance of doubt, the additional context provided in this subsection regarding a declarative programming language, such as the M programming language, is to be considered non-exhaustive and non-limiting. The particular example snippets of pseudo-code set forth below are for illustrative and explanatory purposes only, and are not to be considered limiting on the embodiments of the common intermediate representation for a declarative programming language described above in various detail.

Figure 11:
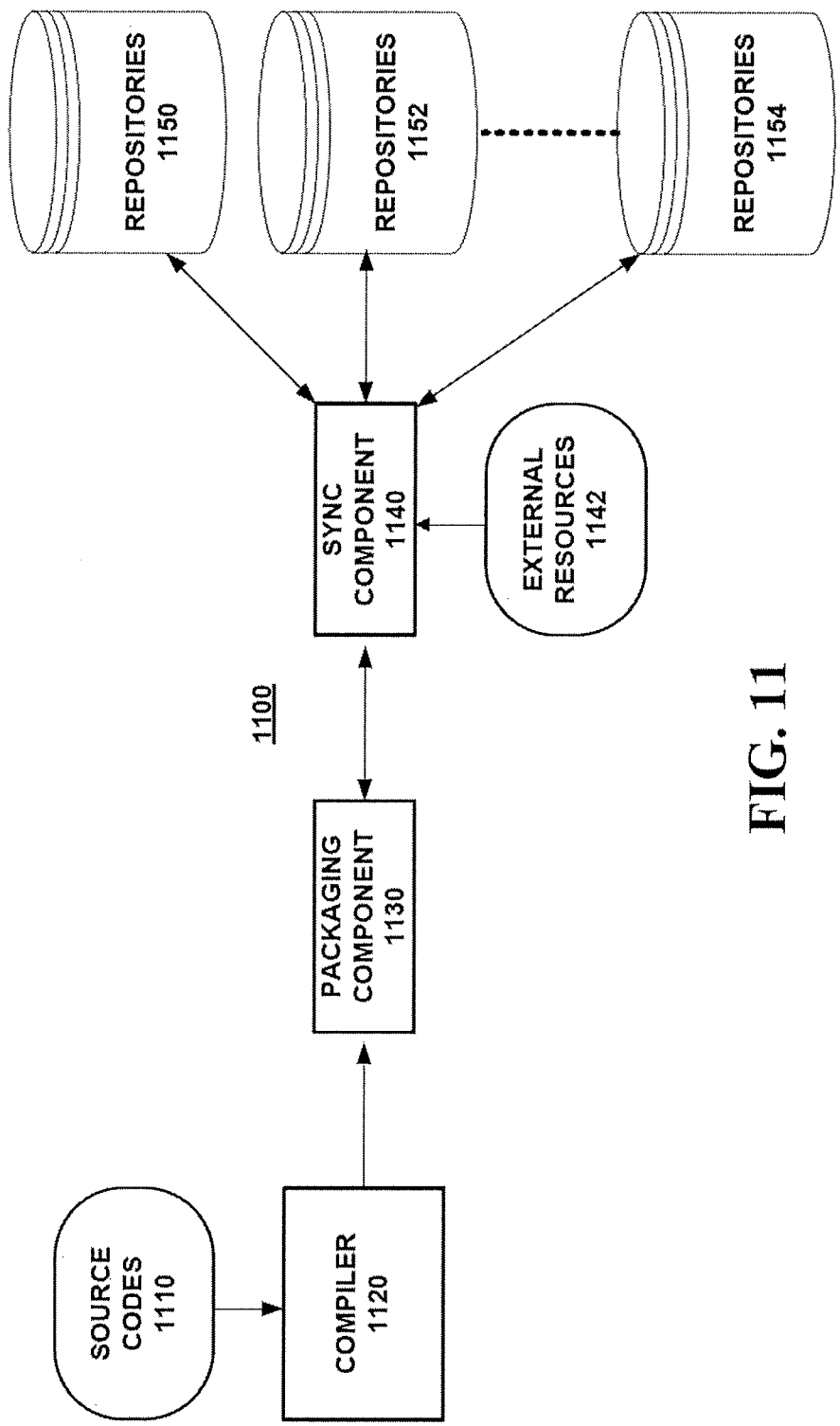
FIG. 11 is an exemplary process chain for a declarative model packaged by an embodiment of the invention.
Figure 12:
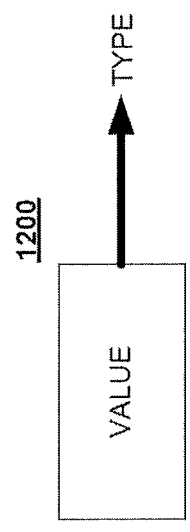
FIG. 12 is an illustration of a type system associated with a record-oriented execution model.
Figure 13:
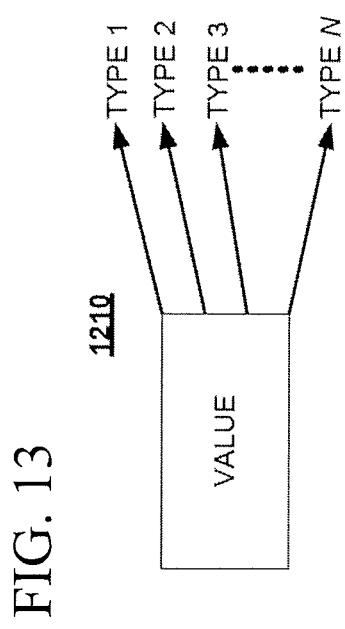
FIG. 13 is a non-limiting illustration of a type system associated with a constraint-based execution model according to an embodiment of the invention.

In FIG. 11, an exemplary process chain for a declarative model is provided, such as a model based on the M programming language. As illustrated, process chain 1100 may include a coupling of compiler 1120, packaging component 1130, synchronization component 1140, and a plurality of repositories 1150, 1152, . . . , 1154. Within such embodiment, a source code 1110 input to compiler 1120 represents a declarative execution model authored in a declarative programming language, such as the M programming language. With the M programming language, for instance, the execution model embodied by source code 1110 advantageously follows constraint-based typing, or structural typing, and/or advantageously embodies an order-independent or unordered execution model to simplify the development of code.

Compiler 1120 processes source codes 1110 and can generate a post-processed definition for each source code. Although other systems perform compilation down to an imperative format, the declarative format of the source code, while transformed, is preserved. Packaging component 1130 packages the post-processed definitions as image files, such as M_Image files in the case of the M programming language, which are installable into particular repositories 1150, 1152, . . . , 1154. Image files include definitions of necessary metadata and extensible storage to store multiple transformed artifacts together with their declarative source model. For example, packaging component 1130 may set particular metadata properties and store the declarative source definition together with compiler output artifacts as content parts in an image file.

With the M programming language, the packaging format employed by packaging component 1130 is conformable with the ECMA Open Packaging Conventions (OPC) standards. One of ordinary skill would readily appreciate that this standard intrinsically offers features like compression, grouping, signing, and the like. This standard also defines a public programming model (API), which allows an image file to be manipulated via standard programming tools. For example, in the .NET Framework, the API is defined within the "System.IO.Packaging" namespace.

Synchronization component 1140 is a tool that can be used to manage image files. For example, synchronization component 1140 may take an image file as an input and link it with a set of referenced image files. In between or afterwards, there could be several supporting tools (like re-writers, optimizers, etc.) operating over the image file by extracting packaged artifacts, processing them and adding more artifacts in the same image file. These tools may also manipulate some metadata of the image file to change the state of the image file, e.g., digitally signing an image file to ensure its integrity and security.

Next, a deployment utility deploys the image file and an installation tool installs it into a running execution environment within repositories 1150, 1152, . . . , 1154. Once an image file is deployed, it may be subject to various post deployment tasks including export, discovery, servicing, versioning, uninstall and more. With the M programming language, the packaging format offers support for all these operations while still meeting enterprise-level industry requirements like security, extensibility, scalability and performance. In one embodiment, repositories 1150 can be a collection of relational database management systems (RDBMS), however any storage can be accommodated.

In one embodiment, the methods described herein are operable with a programming language having a constraint-based type system. Such a constraint-based system provides functionality not simply available with traditional, nominal type systems. In FIGS. 18-19, a nominally typed execution system is compared to a constraint-based typed execution system according to an embodiment of the invention. As illustrated, the nominal system 1800 assigns a particular type for every value, whereas values in constraint-based system 1810 may conform with any of an infinite number of types.

For an illustration of the contrast between a nominally-typed execution model and a constraint-based typed model according to a declarative programming language described herein, such as the D programming language, exemplary code for type declarations of each model are compared below.

First, with respect to a nominally-typed execution model the following exemplary C# code is illustrative:

```
class A
{
    public string Bar;
    public int Foo;
}
class B
{
    public string Bar;
    public int Foo;
}
```

For this declaration, a rigid type-value relationship exists in which A and B values are considered incomparable even if the values of their fields, Bar and Foo, are identical. In contrast, with respect to a constraint-based model, the following exemplary D code (discussed in more detail below) is illustrative of how objects can conform to a number of types:

type A {Bar : Text; Foo : Integer;} type B {Bar : Text; Foo : Integer;} For this declaration, the type-value relationship is much more flexible as all values that conform to type A also conform to B, and vice-versa. Moreover, types in a constraint-based model may be layered on top of each other, which provides flexibility that can be useful, e.g., for programming across various RDBMSs. Indeed, because types in a constraint-based model initially include all values in the universe, a particular value is conformable with all types in which the value does not violate a constraint codified in the type's declaration. The set of values conformable with type defined by the declaration type T : Text where value<128 thus includes "all values in the universe" that do not violate the "Integer" constraint or the "value <128" constraint.

Thus, in one embodiment, the programming language of the source code is a purely declarative language that includes a constraint-based type system as described above, such as implemented in the M programming language.

In another embodiment, the method described herein is also operable with a programming language having an order-independent, or unordered, execution model. Similar to the above described constraint-based execution model, such an order-independent execution model provides flexibility that can be useful, e.g., for programming across various RDBMSs.

Figure 14:
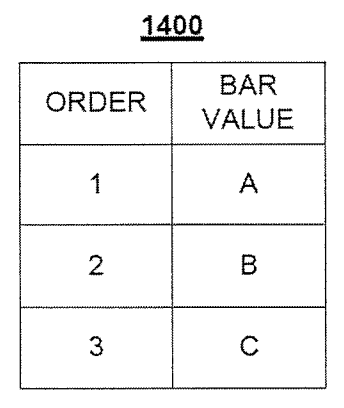
Figure 15:
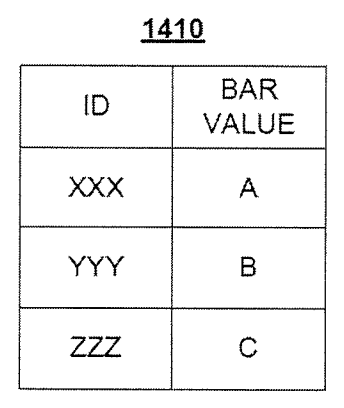

In FIGS. 14-15, for illustrative purposes, a data storage abstraction according to an ordered execution model is compared to a data storage abstraction according to an order-independent execution model. For example, data storage abstraction 1400 of FIG. 14 represents a list Foo created according to an ordered execution model, whereas data abstraction 1410 of FIG. 15 represents a similar list Foo created by an order-independent execution model.

As illustrated, each of data storage abstractions 1400 and 1410 include a set of three Bar values (i.e., "1", "2", and "3"). However, data storage abstraction 1400 requires these Bar values to be entered/listed in a particular order, whereas data storage abstraction 1410 has no such requirement. Instead, data storage abstraction 1410 simply assigns an ID to each Bar value, wherein the order that these Bar values were entered/listed is unobservable to the targeted repository. For instance, data storage abstraction 1410 may have thus resulted from the following order-independent code:

f: Foo*={Bar="1"};
f: Foo*={Bar="2"};
f: Foo*={Bar="3"};

However, data storage abstraction 1410 may have also resulted from the following code:

f: Foo*={Bar="3"};
f: Foo*={Bar="1"};
f: Foo*={Bar="2"};

And each of the two codes above are functionally equivalent to the following code:

f: Foo*={{Bar="2"}, {Bar="3"}, {Bar="1"}};

An exemplary declarative language that is compatible with the above described constraint based typing and unordered execution model is the M programming language, sometimes referred to herein as "M" for convenience, which was developed by the assignee of the present invention. However, in addition to M, it is to be understood that other similar declarative programming languages may be used, and that the utility of the invention is not limited to any single programming language, where any one or more of the embodiments of the directed graph structures described above apply. In this regard, some additional context regarding M is provided below.

As mentioned, M is a declarative language for working with data. M lets users determine how they want to structure and query their data using a convenient textual syntax that is both authorable and readable. In one non-limiting aspect, an M program includes of one or more source files, known formally as compilation units, wherein the source file is an ordered sequence of Unicode characters. Source files typically have a one-to-one correspondence with files in a file system, but this correspondence is not required. For maximal portability, it is recommended that files in a file system be encoded with the UTF-8 encoding.

Conceptually speaking, an M program is compiled using four steps: 1) Lexical analysis, which translates a stream of Unicode input characters into a stream of tokens (Lexical analysis evaluates and executes preprocessing directives); 2) Syntactic analysis, which translates the stream of tokens into an abstract syntax tree; 3) Semantic analysis, which resolves all symbols in the abstract syntax tree, type checks the structure and generates a semantic graph; and 4) Code generation, which generates executable instructions from the semantic graph for some target runtime (e.g. SQL, producing an image). Further tools may link images and load them into a runtime.

As a declarative language, M does not mandate how data is stored or accessed, nor does it mandate a specific implementation technology (in contrast to a domain specific language such as XAML). Rather, M was designed to allow users to write down what they want from their data without having to specify how those desires are met against a given technology or platform. That stated, M in no way prohibits implementations from providing rich declarative or imperative support for controlling how M constructs are represented and executed in a given environment, and thus, enables rich development flexibility.

M builds on three basic concepts: values, types, and extents. These three concepts can be defined as follows: 1) a value is data that conforms to the rules of the M language, 2) a type describes a set of values, and 3) an extent provides dynamic storage for values.

In general, M separates the typing of data from the storage/extent of the data. A given type can be used to describe data from multiple extents as well as to describe the results of a calculation. This allows users to start writing down types first and decide where to put or calculate the corresponding values later.

On the topic of determining where to put values, the M language does not specify how an implementation maps a declared extent to an external store such as an RDBMS. However, M was designed to make such implementations possible and is compatible with the relational model.

With respect to data management, M is a functional language that does not have constructs for changing the contents of an extent, however, M anticipates that the contents of an extent can change via external (to M) stimuli and optionally, M can be modified to provide declarative constructs for updating data.

It is often desirable to write down how to categorize values for the purposes of validation or allocation. In M, values are categorized using types, wherein an M type describes a collection of acceptable or conformant values. Moreover, M types are used to constrain which values may appear in a particular context (e.g., an operand, a storage location).

With a few notable exceptions, M allows types to be used as collections. For example, the "in" operator can be used to test whether a value conforms to a given type, such as:

1 in Number

"Hello, world" in Text

It should be noted that the names of built-in types are available directly in the M language. New names for types, however, may also be introduced using type declarations. For example, the type declaration below introduces the type name "My Text" as a synonym for the "Text" simple type:

type [My Text]: Text;

With this type name now available, the following code may be written:

"Hello, world" in [My Text]

While it is useful to introduce custom names for an existing type, it is even more useful to apply a predicate to an underlying type, such as:

type SmallText : Text where value.Count <7;

In this example, the universe of possible "Text" values has been constrained to those in which the value contains less than seven characters. Accordingly, the following statements hold true for this type definition:

"Terse" in SmallText

!("Verbose" in SmallText)

Type declarations compose:

type TinyText : SmallText where value.Count <6;

However, in this example, this declaration is equivalent to the following:

type TinyText : Text where value.Count <6;

It is noted that the name of the type exists so an M declaration or expression can refer to it. Any number of names can be assigned to the same type (e.g., Text where value.Count <7) and a given value either conforms to all of them or to none of them. For example, consider this example:

type A : Number where value <100;

type B : Number where value <100:

Given these two type definitions, both of the following expressions:

1 in A 1 in B will evaluate to true. If the following third type is introduced:

type C : Number where value >0;

the following can be stated:

1 in C

A general principle of M is that a given value can conform to any number of types. This is a departure from the way many object-based systems work, in which a value is bound to a specific type at initialization-time and is a member of the finite set of subtypes that were specified when the type was defined.

Another type-related operation that bears discussion is the type ascription operator (:). The type ascription operator asserts that a given value conforms to a specific type.

In general, when values in expressions are seen, M has some notion of the expected type of that value based on the declared result type for the operator/function being applied. For example, the result of the logical "and" operator (&&) is declared to be conformant with type "Logical."

It is occasionally useful (or even required) to apply additional constraints to a given value—typically to use that value in another context that has differing requirements. For example, consider the following type definition:

type SuperPositive : Number where value >5;

Assuming that there is a function named "CalcIt" that is declared to accept a value of type "SuperPositive" as an operand, it is desirable to allow expressions like this in M:

CalcIt(20)

CalcIt(42+99)

and prohibit expressions like this:

CalcIt(−1)

CalcIt(4)

In fact, M does exactly what is wanted for these four examples. This is because these expressions express their operands in terms of built-in operators over constants. All of the information needed to determine the validity of the expressions is readily available the moment the M source text for the expression is encountered at little cost.

However, if the expression draws upon dynamic sources of data and/or user-defined functions, the type ascription operator is used to assert that a value will conform to a given type.

To understand how the type ascription operator works with values, a second function, "GetVowelCount," is assumed that is declared to accept an operand of type "Text" and return a value of type "Number" that indicates the number of vowels in the operand.

Since it is unknown based on the declaration of "GetVowelCount" whether its results will be greater than five or not, the following expression is thus not a legal M expression:

CalcIt(GetVowelCount(someTextVariable))

The expression is not legal because the declared result type (Number) of "GetVowelCount" includes values that do not conform to the declared operand type of "CalcIt" (SuperPositive). This expression can be presumed to have been written in error.

However, this expression can be rewritten to the following (legal) expression using the type ascription operator:

CalcIt((GetVowelCount(someTextVariable) : SuperPositive))

By this expression, M is informed that there is enough understanding of the "GetVowelCount" function to know that a value that conforms to the type "SuperPositive" will be obtained. In short, the programmer is telling M that he/she knows what M is doing.

However, if the programmer does not know, e.g., if the programmer misjudged how the "GetVowelCount" function works, a particular evaluation may result in a negative number. Because the "CalcIt" function was declared to only accept values that conform to "SuperPositive," the system will ensure that all values passed to it are greater than five. To ensure this constraint is never violated, the system may inject a dynamic constraint test that has a potential to fail when evaluated. This failure will not occur when the M source text is first processed (as was the case with CalcIt(−1))—rather it will occur when the expression is actually evaluated.

In this regard, M implementations typically attempt to report any constraint violations before the first expression in an M document is evaluated. This is called static enforcement and implementations will manifest this much like a syntax error. However, some constraints can only be enforced against live data and therefore require dynamic enforcement.

In this respect, M make it easy for users to write down their intention and put the burden on the M implementation to "make it work." Optionally, to allow a particular M document to be used in diverse environments, a fully featured M implementation can be configurable to reject M documents that rely on dynamic enforcement for correctness in order to reduce the performance and operational costs of dynamic constraint violations.

For further background regard, M, a type constructor can be defined for specifying collection types. The collection type constructor restricts the type and count of elements a collection may contain. All collection types are restrictions over the intrinsic type "Collection," e.g., all collection values conform to the following expressions:

{ } in Collection
{1, false} in Collection
!("Hello" in Collection)

The last example demonstrates that the collection types do not overlap with the simple types. There is no value that conforms to both a collection type and a simple type.

A collection type constructor specifies both the type of element and the acceptable element count. The element count is typically specified using one of the three operators:

T*—zero or more Ts
T+—one or more Ts
T#m . . . n—between m and n Ts.

The collection type constructors can either use Kleene operators or be written longhand as a constraint over the intrinsic type Collection—that is, the following type declarations describe the same set of collection values:

type SomeNumbers : Number+;
type TwoToFourNumbers : Number#2 . . . 4;
type ThreeNumbers : Number#3;
type FourOrMoreNumbers : Number#4 . . . ;

These types describe the same sets of values as these longhand definitions:

type SomeNumbers : Collection where value.Count >=1
&& item in Number;
type TwoToFourNumbers : Collection where value.Count >=2
&& value.Count <=4
&& item in Number;
type ThreeNumbers : Collection where value.Count=3
&& item in Number;
type FourOrMoreNumbers : Collection where value.Count >=4
&& item in Number;

Independent of which form is used to declare the types, the following expressions can be stated:

!({ } in TwoToFourNumbers)
!({"One", "Two", "Three"} in TwoToFourNumbers)
{1, 2, 3} in TwoToFourNumbers
{1, 2, 3} in ThreeNumbers
{1, 2, 3, 4, 5} in FourOrMoreNumbers The collection type constructors compose with the "where" operator, allowing the following type check to succeed:

{1, 2} in (Number where value <3)* where value.Count % 2=0 It is noted that the inner "where" operator applies to elements of the collection, and the outer "where" operator applies to the collection itself.

Just as collection type constructors can be used to specify what kinds of collections are valid in a given context, the same can be done for entities using entity types.

In this regard, an entity type declares the expected members for a set of entity values. The members of an entity type can be declared either as fields or as calculated values. The value of a field is stored; the value of a calculated value is computed. Entity types are restrictions over the Entity type, which is defined in the M standard library.

The following is a simple entity type:
type MyEntity : Language.Entity;

The type "MyEntity" does not declare any fields. In M, entity types are open in that entity values that conform to the type may contain fields whose names are not declared in the type. Thus, the following type test:

{X=100, Y=200} in MyEntity will evaluate to true, as the "MyEntity" type says nothing about fields named X and Y.

Entity types can contain one or more field declarations. At a minimum, a field declaration states the name of the expected field, e.g.:

type Point {X; Y;}

This type definition describes the set of entities that contain at least fields named X and Y irrespective of the values of those fields, which means that the following type tests evaluate to true:

{X=100, Y=200} in Point
{X=100, Y=200, Z=300} in Point // more fields than expected OK
!({X=100} in Point) // not enough fields—not OK
{X=true, Y="Hello, world"} in Point The last example demonstrates that the "Point" type does not constrain the values of the X and Y fields, i.e., any value is allowed. A new type that constrains the values of X and Y to numeric values is illustrated as follows:

```
type NumericPoint {
    X : Number;
    Y : Number where value > 0;
}
```

It is noted that type ascription syntax is used to assert that the value of the X and Y fields should conform to the type "Number." With this in place, the following expressions evaluate to true:

{X=100, Y=200} in NumericPoint
{X=100, Y=200, Z=300} in NumericPoint
!({X=true, Y="Hello, world"} in NumericPoint)
!({X=0, Y=0} in NumericPoint)

As was seen in the discussion of simple types, the name of the type exists so that M declarations and expressions can refer to it. That is why both of the following type tests succeed:

{X=100, Y=200} in NumericPoint
{X=100, Y=200} in Point even though the definitions of NumericPoint and Point are independent.

Fields in M are named units of storage that hold values. M allows the developer to initialize the value of a field as part of an entity initializer. However, M does not specify any mechanism for changing the value of a field once it is initialized. In M, it is assumed that any changes to field values happen outside the scope of M.

A field declaration can indicate that there is a default value for the field. Field declarations that have a default value do not require conformant entities to have a corresponding field specified (such field declarations are sometimes called optional fields). For example, with respect to the following type definition:

```
type Point3d {
    X : Number;
    Y : Number;
    Z = -1 : Number; // default value of negative one
}
```

Since the Z field has a default value, the following type test will succeed:

{X=100, Y=200} in Point3d

Moreover, if a type ascription operator is applied to the value as follows:

({X=100, Y=200}: Point3d)

then the Z field can be accessed as follows:

({X=100, Y=200}: Point3d).Z in which case this expression will yield the value −1.

In another non-limiting aspect, if a field declaration does not have a corresponding default value, conformant entities must specify a value for that field. Default values are typically written down using the explicit syntax shown for the Z field of "Point3d." If the type of a field is either nullable or a zero-to-many collection, then there is an implicit default value for the declaring field of null for optional and { } for the collection.

For example, considering the following type:

```
type PointND {
    X : Number;
    Y : Number;
    Z : Number?;     // Z is optional
    BeyondZ : Number*; // BeyondZ is optional too
}
```

Then, again, the following type test will succeed:

{X=100, Y=200} in PointND and ascribing the "PointND" to the value yields these defaults:

({X=100, Y=200}: PointND).Z==null
({X=100, Y=200}: PointND).BeyondZ={ }

The choice of using a zero-to-one collection vs. an explicit default value to model optional fields typically comes down to one of style.

Calculated values are named expressions whose values are calculated rather than stored. An example of a type that declares such a calculated value is:

```
type PointPlus {
    X : Number;
    Y : Number;
    // a calculated value
    IsHigh( ) : Logical { Y > 0; }
}
```

Note that unlike field declarations, which end in a semicolon, calculated value declarations end with the expression surrounded by braces.

Like field declarations, a calculated value declaration may omit the type ascription, like this example:

```
type PointPlus {
    X : Number;
    Y : Number;
    // a calculated value with no type ascription
    InMagicQuadrant( ) { IsHigh && X > 0; }
    IsHigh( ) : Logical { Y > 0; }
}
```

In another non-limiting aspect, when no type is explicitly ascribed to a calculated value, M can infer the type automatically based on the declared result type of the underlying expression. In this example, because the logical and operator used in the expression was declared as returning a "Logical," the "InMagicQuadrant" calculated value also is ascribed to yield a "Logical" value.

The two calculated values defined and used above did not require any additional information to calculate their results other than the entity value itself. A calculated value may optionally declare a list of named parameters whose actual values must be specified when using the calculated value in an expression. The following is an example of a calculated value that requires parameters:

```
type PointPlus {
    X : Number;
    Y : Number;
    // a calculated value that requires a parameter
    WithinBounds(radius : Number) : Logical {
        X * X + Y * Y <= radius * radius;
    }
    InMagicQuadrant( ) { IsHigh && X > 0; }
    IsHigh( ) : Logical { Y > 0; }
}
```

To use this calculated value in an expression, one provides values for the two parameters as follows:

({X=100, Y=200}: PointPlus).WithinBounds(50)

When calculating the value of "WithinBounds," M binds the value 50 to the symbol radius, which causes the "Within-Bounds" calculated value to evaluate to false.

It is noted with M that both calculated values and default values for fields are part of the type definition, not part of the values that conform to the type. For example, considering these three type definitions:

```
type Point {
    X : Number;
    Y : Number;
}
type RichPoint {
    X : Number;
    Y : Number;
    Z = −1 : Number;
    IsHigh( ) : Logical { X < Y; }
}
type WeirdPoint {
    X : Number;
    Y : Number;
    Z = 42 : Number;
    IsHigh( ) : Logical { false; }
}
```

Since RichPoint and WeirdPoint only have two required fields (X and Y), the following can be stated:

{X=1, Y=2} in RichPoint
{X=1, Y=2} in WeirdPoint

However, the "IsHigh" calculated value is only available when one of these two types is ascribed to the entity value:

({X=1, Y=2}: RichPoint).IsHigh=true
({X=1, Y=2}: WeirdPoint).IsHigh=false

Because the calculated value is purely part of the type and not the value, when the ascription is chained, such as follows:

(({X=1, Y=2}: RichPoint): WeirdPoint).IsHigh=false then, the outer-most ascription determines which function is called.

A similar principle is at play with respect to how default values work. It is again noted the default value is part of the type, not the entity value. Thus, when the following expression is written:

({X=1, Y=2}: RichPoint).Z=−1 the underlying entity value still only contains two field values (1 and 2 for X and Y, respectively). In this regard, where default values differ from calculated values, ascriptions are chained. For example, considering the following expression:

(({X=1, Y=2}: RichPoint): WeirdPoint).Z=−1

Since the "RichPoint" ascription is applied first, the resultant entity has a field named Z having a value of −1; however, there is no storage allocated for the value, i.e., it is part of the type's interpretation of the value. Accordingly, when the "Weird-Point" ascription is applied, it is applied to the result of the first ascription, which does have a field named Z, so that value is used to specify the value for Z. The default value specified by "WeirdPoint" is thus not needed.

Like all types, a constraint may be applied to an entity type using the "where" operator. Consider the following M type definition:

```
type HighPoint {
    X : Number;
    Y : Number;
} where X < Y;
```

In this example, all values that conform to the type "HighPoint" are guaranteed to have an X value that is less than the Y value. That means that the following expressions:
 {X=100, Y=200} in HighPoint
 !({X=300, Y=200} in HighPoint)
both evaluate to true.

Moreover, with respect to the following type definitions:

```
type Point {
    X : Number;
    Y : Number;
}
type Visual {
    Opacity : Number;
}
type VisualPoint {
    DotSize : Number;
} where value in Point && value in Visual;
``` the third type, "VisualPoint," names the set of entity values that have at least the numeric fields X, Y, Opacity, and DotSize.

Since it is a common desire to factor member declarations into smaller pieces that can be composed, M also provides explicit syntax support for factoring. For instance, the "VisualPoint" type definition can be rewritten using that syntax:

```
type VisualPoint : Point, Visual {
    DotSize : Number;
}
```

To be clear, this is shorthand for the long-hand definition above that used a constraint expression. Furthermore, both this shorthand definition and long-hand definition are equivalent to this even longer-hand definition:

```
type VisualPoint = {
    X : Number;
    Y : Number;
    Opacity : Number;
    DotSize : Number;
}
```

Again, the names of the types are just ways to refer to types—the values themselves have no record of the type names used to describe them.

M can also extend LINQ query comprehensions with several features to make authoring simple queries more concise. The keywords, "where" and "select" are available as binary infix operators. Also, indexers are automatically added to strongly typed collections. These features allow common queries to be authored more compactly as illustrated below.

As an example of where as an infix operator, the following query extracts people under 30 from a defined collection of "People":
 from p in People
 where p.Age=30
 select p
An equivalent query can be written:
 People where value.Age=30
The "where" operator takes a collection on the left and a Boolean expression on the right. The "where" operator introduces a keyword identifier value in to the scope of the Boolean expression that is bound to each member of the collection. The resulting collection contains the members for which the expression is true. Thus, the expression:
 Collection where Expression
is equivalent to:
 from value in Collection
 where Expression
 select value
The M compiler adds indexer members on collections with strongly typed elements. For the collection "People," for instance, the compiler might add indexers for "First(Text)," "Last(Text)," and "Age(Number)."
Accordingly, the statement:
 Collection . Field (Expression)
is equivalent to:
 from value in Collection
 where Field=Expression
 select value
"Select" is also available as an infix operator. With respect to the following simple query:
 from p in People
 select p.First+p.Last
the "select" expression is computed over each member of the collection and returns the result. Using the infix "select" the query can be written equivalently as:
 People select value.First+value.Last
The "select" operator takes a collection on the left and an arbitrary expression on the right. As with "where," "select" introduces the keyword identifier value that ranges over each element in the collection. The "select" operator maps the expression over each element in the collection and returns the result. For another example, the statement:
 Collection select Expression
is equivalent to the following:
 from value in Collection
 select Expression
A trivial use of the "select" operator is to extract a single field:
 People select value.First
The compiler adds accessors to the collection so single fields can be extracted directly as "People.First" and "People.Last."

To write a legal M document, all source text appears in the context of a module definition. A module defines a top-level namespace for any type names that are defined. A module also defines a scope for defining extents that will store actual values, as well as calculated values.

The following is a simple example of a module definition:

```
module Geometry {
    // declare a type
    type Point {
        X : Integer; Y : Integer;
    }
```

-continued

```
        // declare some extents
        Points : Point*;
        Origin : Point;
        // declare a calculated value
        TotalPointCount { Points.Count + 1; }
    }
```

In this example, the module defines one type named "Geometry.Point." This type describes what point values will look like, but does not define any locations where those values can be stored.

This example also includes two module-scoped fields (Points and Origin). Module-scoped field declarations are identical in syntax to those used in entity types. However, fields declared in an entity type simply name the potential for storage once an extent has been determined; in contrast, fields declared at module-scope name actual storage that must be mapped by an implementation in order to load and interpret the module.

In addition, modules can refer to declarations in other modules by using an import directive to name the module containing the referenced declarations. For a declaration to be referenced by other modules, the declaration is explicitly exported using an export directive.

For example, considering the following module:

```
        module MyModule {
            import HerModule; // declares HerType
            export MyType1;
            export MyExtent1;
            type MyType1 : Logical*;
            type MyType2 : HerType;
            MyExtent1 : Number*;
            MyExtent2 : HerType;
        }
```

It is noted that only "MyType1" and "MyExtent1" are visible to other modules, which makes the following definition of "HerModule" legal:

```
        moduleHerModule {
            import MyModule; // declares MyType1 and MyExtent1
            export HerType;
            type HerType : Text where value.Count < 100;
            type Private : Number where !(value in MyExtent1);
            SomeStorage : MyType1;
        }
```

As this example shows, modules may have circular dependencies.

The types of the M language are divided into two main categories: intrinsic types and derived types. An intrinsic type is a type that cannot be defined using M language constructs but rather is defined entirely in the M language specification. An intrinsic type may name at most one intrinsic type as its super-type as part of its specification. Values are an instance of exactly one intrinsic type, and conform to the specification of that one intrinsic type and all of its super types.

A derived type is a type whose definition is constructed in M source text using the type constructors that are provided in the language. A derived type is defined as a constraint over another type, which creates an explicit subtyping relationship. Values conform to any number of derived types simply by virtue of satisfying the derived type's constraint. There is no a priori affiliation between a value and a derived type—rather a given value that conforms to a derived type's constraint may be interpreted as that type at will.

M offers a broad range of options in defining types. Any expression which returns a collection can be used as a type. The type predicates for entities and collections are expressions and fit this form. A type declaration may explicitly enumerate its members or be composed of other types.

Another distinction is between a structurally typed language, like M, and a nominally typed language. A type in M is a specification for a set of values. Two types are the same if the exact same collection of values conforms to both regardless of the name of the types. It is not required that a type be named to be used. A type expression is allowed wherever a type reference is required. Types in M are simply expressions that return collections.

Types are considered collections of all values that satisfy the type predicate. For that reason, any operation on a collection can be applied to a type and a type can be manipulated with expressions like any other collection value.

M provides two primary means for values to come into existence: calculated values and stored values (a.k.a. fields). Calculated and stored values may occur with both module and entity declarations and are scoped by their container. A computed value is derived from evaluating an expression that is typically defined as part of M source text. In contrast, a field stores a value and the contents of the field may change over time.

Exemplary Networked and Distributed Environments

One of ordinary skill in the art can appreciate that the various embodiments for the common intermediate representations for a declarative programming model described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may cooperate to perform one or more aspects of any of the various embodiments of the subject disclosure.

Figure 16:
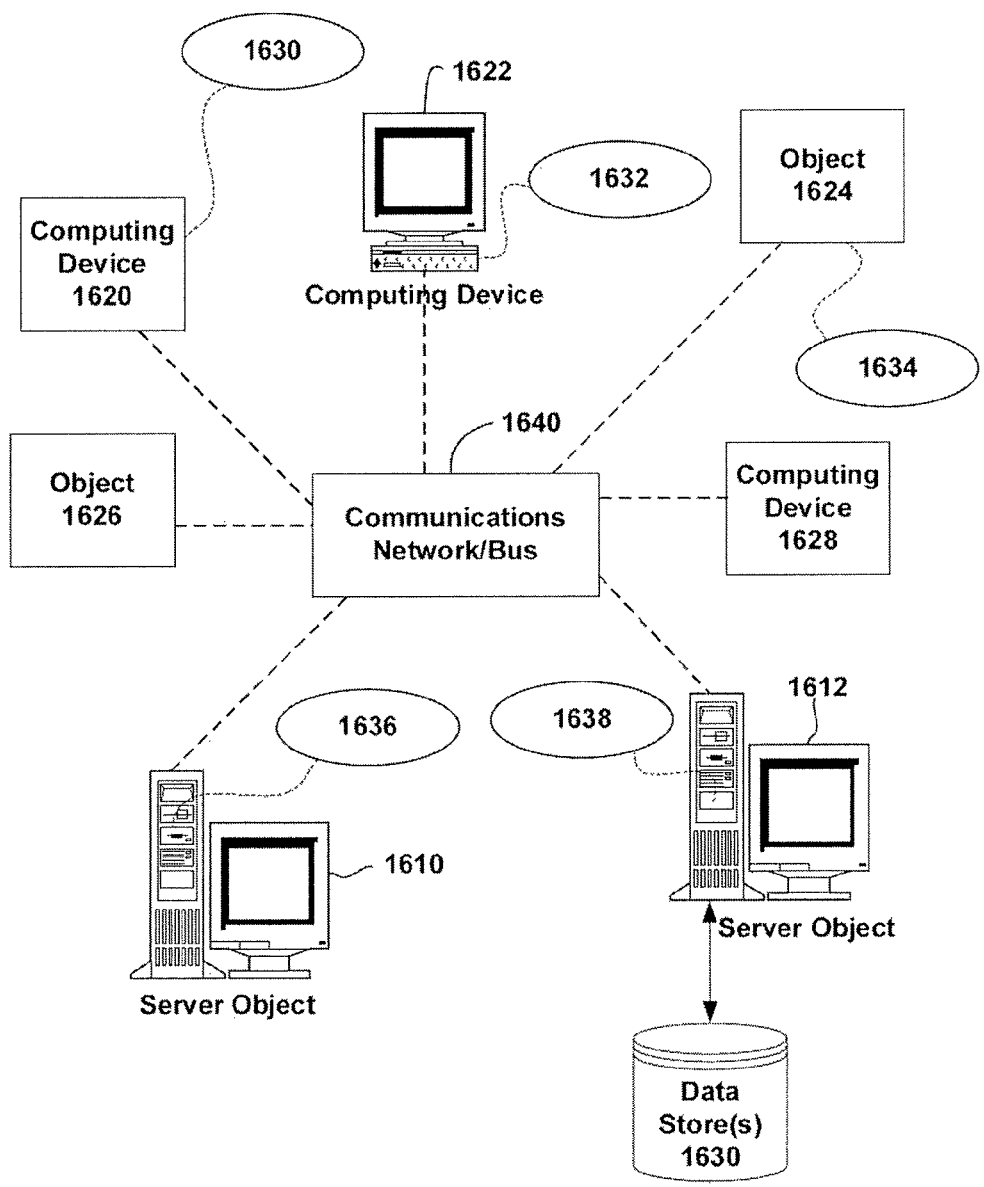
FIG. 16 is a block diagram representing exemplary non-limiting networked environments in which various embodiments described herein can be implemented.

FIG. 16 provides a schematic diagram of an exemplary networked or distributed computing environment. The distributed computing environment comprises computing objects 1610, 1612, etc. and computing objects or devices 1620, 1622, 1624, 1626, 1628, etc., which may include programs, methods, data stores, programmable logic, etc., as represented by applications 1630, 1632, 1634, 1636, 1638. It can be appreciated that objects 1610, 1612, etc. and computing objects or devices 1620, 1622, 1624, 1626, 1628, etc. may comprise different devices, such as PDAs, audio/video devices, mobile phones, MP3 players, personal computers, laptops, etc.

Each object 1610, 1612, etc. and computing objects or devices 1620, 1622, 1624, 1626, 1628, etc. can communicate with one or more other objects 1610, 1612, etc. and computing objects or devices 1620, 1622, 1624, 1626, 1628, etc. by way of the communications network 1640, either directly or indirectly. Even though illustrated as a single element in FIG. 16, network 1640 may comprise other computing objects and computing devices that provide services to the system of FIG. 16, and/or may represent multiple interconnected networks, which are not shown. Each object 1610, 1612, etc. or 1620, 1622, 1624, 1626, 1628, etc. can also contain an application, such as applications 1630, 1632, 1634, 1636, 1638, that might make use of an API, or other object, software, firmware and/or hardware, suitable for communication with, processing for, or implementation of the common intermediate representation for a data scripting language provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the common intermediate representation for a data scripting language as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 16, as a non-limiting example, computers 1620, 1622, 1624, 1626, 1628, etc. can be thought of as clients and computers 1610, 1612, etc. can be thought of as servers where servers 1610, 1612, etc. provide data services, such as receiving data from client computers 1620, 1622, 1624, 1626, 1628, etc., storing of data, processing of data, transmitting data to client computers 1620, 1622, 1624, 1626, 1628, etc., although any computer can be considered a client, a server, or both, depending on the circumstances. Any of these computing devices may be processing data, encoding data, querying data or requesting services or tasks that may implicate the common intermediate representations as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the common intermediate representation for a data scripting language can be provided standalone, or distributed across multiple computing devices or objects.

In a network environment in which the communications network/bus 1640 is the Internet, for example, the servers 1610, 1612, etc. can be Web servers with which the clients 1620, 1622, 1624, 1626, 1628, etc. communicate via any of a number of known protocols, such as the hypertext transfer protocol (HTTP). Servers 1610, 1612, etc. may also serve as clients 1620, 1622, 1624, 1626, 1628, etc., as may be characteristic of a distributed computing environment.

Exemplary Computing Device

As mentioned, advantageously, the techniques described herein can be applied to any device where it is desirable to develop and execute data intensive applications, e.g., query large amounts of data quickly. It should be understood, therefore, that handheld, portable and other computing devices and computing objects of all kinds are contemplated for use in connection with the various embodiments, i.e., anywhere that a device may wish to scan or process huge amounts of data for fast and efficient results. Accordingly, the below general purpose remote computer described below in FIG. 17 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 17:
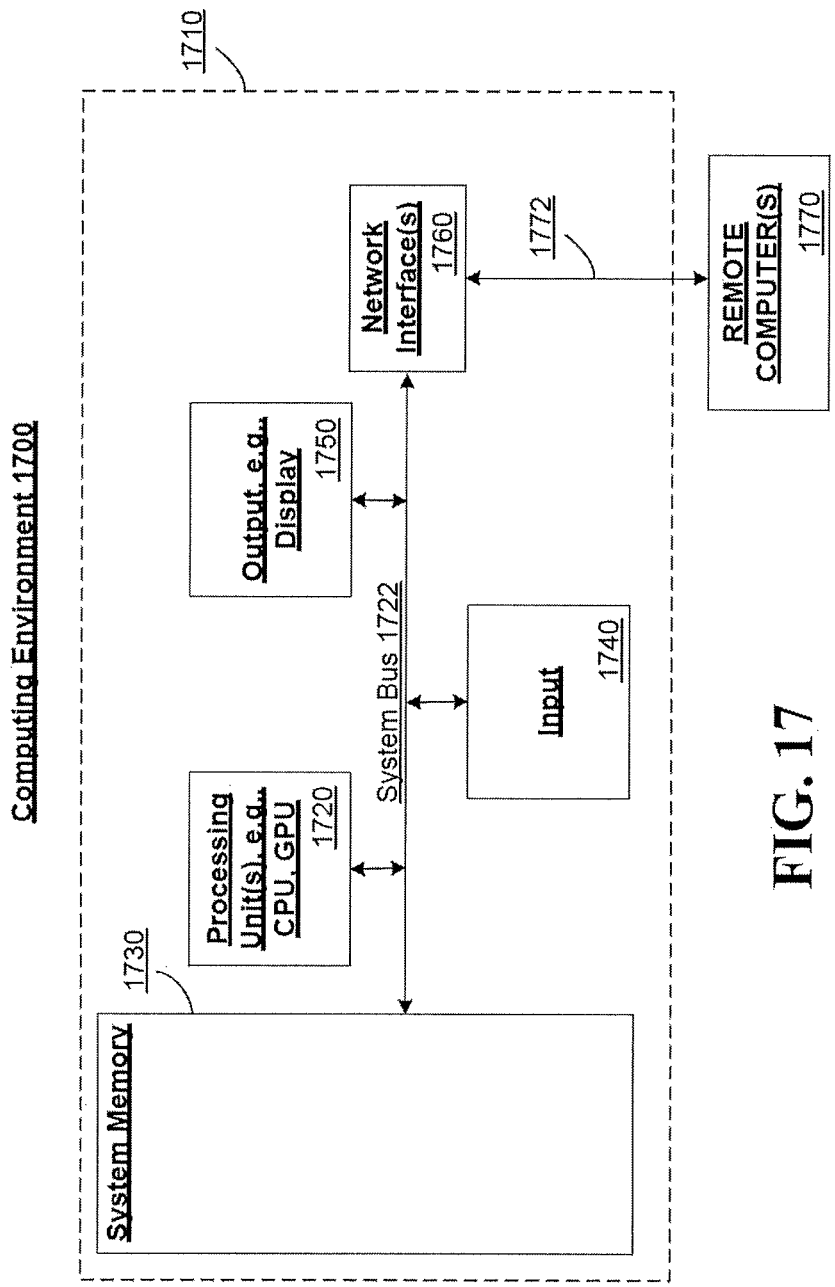
FIG. 17 is a block diagram representing an exemplary non-limiting computing system or operating environment in which one or more aspects of various embodiments described herein can be implemented.

FIG. 17 thus illustrates an example of a suitable computing system environment 1700 in which one or aspects of the embodiments described herein can be implemented, although as made clear above, the computing system environment 1700 is only one example of a suitable computing environment and is not intended to suggest any limitation as to scope of use or functionality. Neither should the computing environment 1700 be interpreted as having any dependency or requirement relating to any one or combination of components illustrated in the exemplary operating environment 1700.

With reference to FIG. 17, an exemplary remote device for implementing one or more embodiments includes a general purpose computing device in the form of a computer 1710. Components of computer 1710 may include, but are not limited to, a processing unit 1720, a system memory 1730, and a system bus 1722 that couples various system components including the system memory to the processing unit 1720.

Computer 1710 typically includes a variety of computer readable media and can be any available media that can be accessed by computer 1710. The system memory 1730 may include computer storage media in the form of volatile and/or nonvolatile memory such as read only memory (ROM) and/or random access memory (RAM). By way of example, and not limitation, memory 1730 may also include an operating system, application programs, other program modules, and program data.

A user can enter commands and information into the computer 1710 through input devices 1740. A monitor or other type of display device is also connected to the system bus 1722 via an interface, such as output interface 1750. In addition to a monitor, computers can also include other peripheral output devices such as speakers and a printer, which may be connected through output interface 1750.

The computer 1710 may operate in a networked or distributed environment using logical connections to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1772, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to develop and execute data intensive applications.

Also, there are multiple ways to implement the same or similar functionality, e.g., an appropriate API, tool kit, driver code, operating system, control, standalone or downloadable software object, etc. which enables applications and services to use the efficient encoding and querying techniques. Thus, embodiments herein are contemplated from the standpoint of an API (or other software object), as well as from a software or hardware object that provides or acts with respect to common intermediate representations for a data scripting language. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A computer-implemented method for defining declarative code in an intermediate machine readable representation, including:

specifying a plurality of programming constructs of a declarative programming language, wherein the declarative programming language adheres to an order independent execution model that facilitates entering values into a data abstraction of the order independent execution model in an order unobservable to a target repository, and wherein the specifying further includes specifying state information about at least one programming construct of the plurality of programming constructs; and generating a machine readable intermediate language representation of the declarative programming language, wherein data representing the declarative programming language according to the intermediate language representation can be stored in any of a plurality of underlying storage abstractions, and wherein the generating includes representing the state information as at least one attached property, wherein the generating includes representing type checking data in the at least one abstract syntax tree structure as at least one other attached property, the type checking data used to confirm validity of a particular programming construct, wherein the generating includes versioning at least one node of a pre-existing abstract syntax tree structure.

2. The computer-implemented method of claim 1, further comprising:
storing tree structure data representative of the at least one abstract syntax tree structure in at least one data store.

3. The computer-implemented method of claim 1, wherein the generating includes referencing at least one other abstract syntax tree structure.

4. The computer-implemented method of claim 1, wherein the generating includes modifying at least one node of a pre-existing abstract syntax tree structure.

5. A computer-readable memory device comprising computer-readable instructions for causing at least one processor to execute the following components:
an input component configured to receive a definition of programmatic elements of at least one abstract syntax tree representation of a declarative programming language according to a common intermediate representation, wherein data representing the declarative programming language according to the common intermediate representation can be stored in any of a plurality of underlying storage abstractions, and wherein values associated with the programmatic elements are conformable to a plurality of types such that a particular value is conformable with each of the plurality of types in which the particular value does not violate a constraint codified in a type declaration;
an abstract syntax tree processing component configured to format at least one abstract syntax tree data structure based on the definition of the programmatic elements and further configured to generate at least one executable program based on the at least one abstract syntax tree data structure; and
an abstract syntax tree manipulation component configured to expose the programmatic elements represented by the at least one abstract syntax tree data structure, wherein the abstract syntax tree manipulation component is further configured to facilitate augmenting node information of the at least one abstract syntax tree data structure with state information via attached properties including representing type checking data in the at least one abstract syntax tree data structure as at least one other attached property, the type checking data used to confirm validity of a particular programmatic element.

6. The computer-readable memory device of claim 5, wherein the abstract syntax tree manipulation component is configured to facilitate a versioning of the at least one abstract syntax tree data structure.

7. The computer-readable memory device of claim 5, further comprising:
an abstract syntax tree executable component configured to form and execute executable declarative code based on the at least one abstract syntax tree data structure.

8. The computer-readable memory device of claim 5, further comprising:
an abstract syntax tree executable component configured to form and execute executable declarative code based on at least one semantic graph formed from a semantic analysis of the at least one abstract syntax tree data structure.

9. The computer-readable memory device of claim 5, further comprising:
at least one data store; and
an abstract syntax tree storage component configured to store syntactic element data of nodes of the at least one abstract syntax tree data structure in the at least one data store.

10. The computer-readable memory device of claim 9, wherein the abstract syntax tree storage component is further configured to store at least a portion of the syntactic element data by referencing nodes of a pre-stored abstract syntax tree data structure in one or more of the at least one data store.

11. A computer-implemented method for defining declarative code in an intermediate machine readable representation, including:
specifying a plurality of programming constructs of a declarative programming language, wherein the declarative programming language adheres to an order independent execution model that facilitates entering values into a data abstraction of the order independent execution model in an order unobservable to a target repository, and wherein the specifying includes specifying state information about at least one programming construct of the plurality of programming constructs; and
generating a machine readable intermediate language representation of the declarative programming language, wherein data representing the declarative programming language according to the intermediate language representation can be stored in any of a plurality of underlying storage abstractions, and wherein the generating includes representing the state information as at least one attached property, wherein the generating further includes representing type checking data over at least one type of the programming constructs in at least one semantic graph structure as the at least one attached property, the type checking data used to confirm validity of a particular programming construct, wherein the generating includes versioning at least one node of a pre-existing abstract syntax tree structure.

12. The computer-implemented method of claim 11, further comprising:
storing or referencing semi-structured data representative of the at least one semantic graph structure in at least one data store.

13. A system, comprising:
a memory having computer executable components stored thereon; and
a processor communicatively coupled to the memory, the processor configured to execute the computer executable components, the computer executable components comprising:
an input component configured to receive a definition of programmatic elements of at least one abstract syntax tree representation of a declarative programming language according to a common intermediate representation, wherein data representing the declarative programming language according to the common intermediate representation can be stored in any of a plurality of underlying storage abstractions, and wherein values associated with the programmatic elements are conformable to a plurality of types such that a particular value is conformable with each of the plurality of types in which the particular value does not violate a constraint codified in a type declaration;

an abstract syntax tree processing component configured to format at least one abstract syntax tree data structure based on the definition of the programmatic elements; and an abstract syntax tree manipulation component configured to expose the programmatic elements represented by the at least one abstract syntax tree data structure, wherein the abstract syntax tree manipulation component is further configured to facilitate augmenting node information of the at least one abstract syntax tree data structure with state information via attached properties including representing type checking data in the at least one abstract syntax tree data structure as at least one other attached property, the type checking data used to confirm validity of a particular programmatic element.

14. The system of claim 13, wherein the abstract syntax tree processing component is further configured to generate at least one executable program based on the at least one abstract syntax tree data structure.

15. The system of claim 13, wherein the declarative programming language adheres to an order independent execution model that facilitates entering values into a data abstraction of the order independent execution model in an order unobservable to a target repository.

* * * * *